United States Patent [19]

Rekers et al.

[11] Patent Number: 5,321,105

[45] Date of Patent: Jun. 14, 1994

[54] POLYMERIZATION PROCESS USING A BIMODAL SILICA GEL AS A CATALYST SUPPORT

[75] Inventors: Louis J. Rekers, Wyoming; Roger D. Laib, Cincinnati, both of Ohio

[73] Assignee: Quantum Chemical Corporation, Cincinnati, Ohio

[21] Appl. No.: 31,243

[22] Filed: Mar. 12, 1993

Related U.S. Application Data

[62] Division of Ser. No. 757,562, Sep. 11, 1991, Pat. No. 5,231,066.

[51] Int. Cl.$^5$ .............................................. C08F 4/24
[52] U.S. Cl. .................... 526/104; 526/113; 526/130; 526/352; 502/239
[58] Field of Search ............... 526/104, 113, 130, 352

[56] References Cited

U.S. PATENT DOCUMENTS

| | | | |
|---|---|---|---|
| 1,748,315 | 2/1930 | Stoewener | 423/338 |
| 3,397,153 | 8/1968 | Sippel | 502/234 |
| 3,644,323 | 2/1972 | Norwood et al. | 260/94.9 D |
| 3,652,214 | 3/1972 | Aboutboul et al. | 23/182 |
| 3,652,215 | 3/1972 | Aboutboul et al. | 23/182 R |
| 3,652,216 | 3/1972 | Krekeler et al. | 23/182 R |
| 3,846,537 | 11/1974 | Marotta | 423/338 |
| 3,898,322 | 8/1975 | Leach | 423/628 |
| 3,949,030 | 4/1976 | Murata | 264/43 |
| 3,960,826 | 6/1976 | Aboutboul et al. | 526/103 |
| 3,977,993 | 8/1976 | Lynch | 423/338 |
| 4,025,707 | 5/1977 | Hogan | 526/105 |
| 4,053,565 | 10/1977 | Krekeler et al. | 423/338 |
| 4,112,032 | 9/1978 | Blaszyk et al. | 264/42 |
| 4,246,137 | 1/1981 | Dombro et al. | 252/436 |
| 4,257,922 | 3/1981 | Kim et al. | 252/465 |
| 4,279,780 | 7/1981 | Dombro | 252/452 |
| 4,294,685 | 10/1981 | Kim et al. | 208/10 |
| 4,301,037 | 11/1981 | Sanchez et al. | 252/462 |
| 4,315,839 | 2/1982 | Bouge et al. | 252/448 |
| 4,434,280 | 2/1984 | McDaniel et al. | 526/106 |
| 4,436,882 | 3/1984 | Witt | 526/106 |
| 4,560,733 | 12/1985 | Martin nee Sturdy et al. | 526/129 |
| 4,595,578 | 6/1986 | Cohen et al. | 23/338 |
| 4,780,446 | 10/1988 | Nozemack et al. | 502/235 |
| 4,791,089 | 12/1988 | Dombro et al. | 502/236 |
| 4,849,378 | 7/1989 | Hench et al. | 501/12 |
| 4,913,966 | 4/1990 | Garvey et al. | 423/338 |
| 4,918,038 | 4/1990 | Samuels et al. | 502/112 |
| 5,115,053 | 5/1992 | Knudsen et al. | 526/106 |

FOREIGN PATENT DOCUMENTS

| | | | |
|---|---|---|---|
| 545049 | 8/1957 | Canada | 502/233 |
| 501109 | 5/1981 | Japan | 502/233 |

OTHER PUBLICATIONS

R. Snel, "Control of the Porous Structure of Amorphous Silica-Alumina 3. The Influence of Pore-Regulating Reagents", *Applied Catalysis* (12) pp. 347-357 (1984).

R. Snel, "Control of the Porous Structure of Amorphous Silica-Alumina 4. Nitrogen Bases as Pore-Regulating Reagent", *Applied Catalysis* (33) pp. 281-294 (1987).

K. Onuma, "Preparation of Bimodal Alumina and Other Refractory Inorganic Oxides-Suitable Supports for Hydrotreating Catalysts", *Preparation of Catalysts IV*, pp. 543-555 (1987).

R. Snel, "Control of the Porous Structure of Amorphous Silica-Alumina I. The Effects of Sodium Ions and Syneresis", *Applied Catalysis*, (11), pp. 271-280 (1984).

R. Snel, "Control of the Porous Structure of Amorphous Silica-Alumina II. The Effects of pH and Reactant Concentration", *Applied Catalysis*, (12), pp. 189-200 (1984).

Primary Examiner—Joseph L. Schofer
Assistant Examiner—David Wu
Attorney, Agent, or Firm—Gerald A. Baracka; William A. Heidrich

[57] ABSTRACT

A bimodal silica gel particle, its method of preparation and its use as a catalyst support in the polymerization of olefins is disclosed. The bimodal silica gel particle exhibits a bimodal pore radius distribution, wherein the silica gel particle has a first average pore radius and a second average pore radius differing by at least about 20 Å. The bimodal silica gel particle is useful as a support for a transition metal-based catalyst to provide a polyolefin having a broad or bimodal molecular weight distribution.

36 Claims, 7 Drawing Sheets

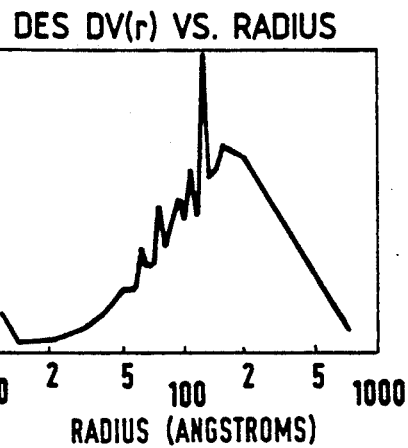
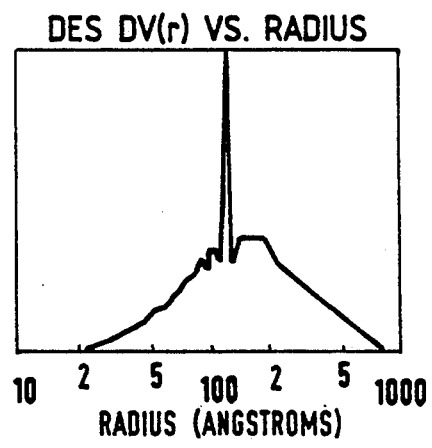
Fig. 12                    Fig. 13
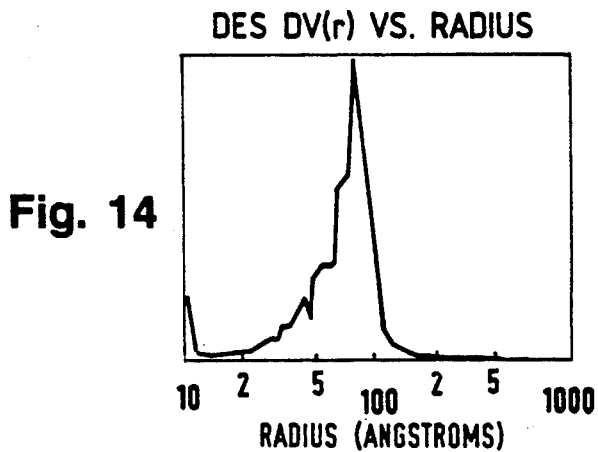
Fig. 14
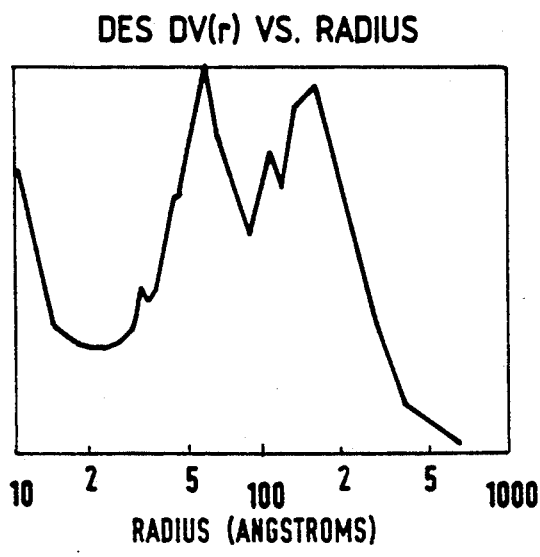
Fig. 15

DES DV(r) VS. RADIUS

DES DV(r) VS. RADIUS

DES DV(r) VS. RADIUS

DES DV(r) VS. RADIUS

DES DV(r) VS. RADIUS

DES DV(r) VS. RADIUS

RADIUS (ANGSTROMS)

DES DV(r) VS. RADIUS

RADIUS (ANGSTROMS)

POLYMERIZATION PROCESS USING A BIMODAL SILICA GEL AS A CATALYST SUPPORT

CROSS-REFERENCE TO RELATED APPLICATION

This is a division of copending, commonly assigned U.S. application Ser. No. 07/757,562 filed Sept. 11, 1991 now U.S. Pat. No. 5,231,066, Jul. 27, 1993.

FIELD OF THE INVENTION

The present invention is directed to a silica gel particle having a bimodal pore radius distribution, and its method of manufacture; to a transition metal based catalyst including the bimodal silica gel particle as a support, and its method of manufacture; and to a method of making polyolefins having broad or bimodal molecular weight distributions by utilizing the catalyst including the bimodal silica gel particle.

In particular, the present invention is directed to a method of preparing a silica gel particle having a bimodal pore radius distribution, wherein an aqueous solution of a silicate is added to an aqueous acid solution until a silica hydrogel is precipitated; aging the precipitated silica hydrogel in the resulting solution to provide a silica hydrogel having a first average pore radius; adding an additional amount of the silicate solution to the silica hydrogel and the resulting solution to raise the pH of the solution to at least about 9; adding an acid to the hydrogel and the solution having a pH of at least about 9 to precipitate additional silicate as a hydrogel having a second average pore radius on the hydrogel having the first average pore radius; and heat-aging the hydrogel to fix the respective first and second average pore radii of the hydrogel.

The resulting hydrogel particle is converted into a silica xerogel having a first and a second average pore radii, and the bimodal silica xerogel is useful as a support for a transition metal based catalyst, such as a chromic-based catalyst. The transition metal based catalyst is used in the polymerization of an olefin to produce polyolefins having broad or bimodal molecular weight distributions.

BACKGROUND OF THE INVENTION

Silica gels have numerous industrial applications, including use as sorbents and as catalyst supports, including supports for olefin polymerization catalysts. Specifically, these olefin polymerization catalysts include a catalytic transition metal, such as chromium, deposited on a silica xerogel support that may be activated by high-temperature oxidation. Olefins are polymerized in the presence of such catalysts to produce various polyolefins having different molecular weight distributions and melt indices, depending upon the particular temperature, pressure, solvent, catalyst and other polymerization conditions employed.

The production of low molecular weight, high melt index polyolefins is of particular interest because such polyolefins are widely used in films and sheets, in extrusion coating, in injection and rotational molding, and in similar industrial applications. In many applications, such as in extrusion or molding applications, a polyolefin, such as polyethylene, having a broad or multimodal (e.g. bimodal) molecular weight distribution exhibits excellent processing characteristics, such as a faster throughput rate with lower energy requirements.

In many applications, polyolefin toughness, strength, and environmental stress cracking resistance (ESCR) are important properties. These properties are enhanced when the polyolefin has a high molecular weight. However, as the molecular weight of the polyolefin increases, the ability to process the polyolefin resin usually decreases. Therefore, by providing a polyolefin having a broad or bimodal molecular weight distribution, the important physical properties exhibited by high molecular weight resins are retained, and advantageous processing properties, particularly extrudability, of the polyolefin resin are improved.

When a polyolefin has a bimodal molecular weight distribution, a molecular weight distribution plot (by size exclusion chromatography) of concentration of species of specific molecular weight vs. log molecular weight has at least two maxim. The two maxima are characteristic of a bimodal molecular weight distribution, and the maxim need not be equivalent in magnitude or widely separated for the resin to exhibit the properties of a bimodal polyolefin.

Three major techniques have been proposed or used to produce polyolefin resins having a broad or bimodal molecular weight distribution. One technique is post reactor or melt blending of two or more polyolefins having different molecular weights. This technique has the disadvantages of requiring complete homogenization of at least two polyolefin resins and an attendant high cost. A second technique utilizes multistage reactors, but this technique has a low efficiency and, again, an attendant high cost. The third, and most desirable, technique is the direct production of a broad or bimodal polyolefin from a single catalyst, or catalyst mixture, in a single reactor. Such a process would provide a polyolefin having a broad or bimodal molecular weight distribution in situ, with the polyolefin components having a different molecular weight being intimately mixed on the subparticle level.

The production of a broad or bimodal polyethylene resin by a single catalyst, or by a catalyst mixture, in a single reactor has been disclosed. For example, U.S. Pat. No. 4,025,707 discloses the preparation of ethylene homopolymers and copolymers of broadened molecular weight distribution S by utilizing a mixed catalyst comprising several portions of the saute or different chromium components, and metal promoted variations thereof, wherein each portion is activated at a different temperature. U.S. Pat. No. 4,560,733 discloses combining magnesium and titanium-containing catalyst components. The catalyst is prepared by milling a blend of at least two silica-containing components having different melt index potentials. U.S. Pat. No. 4,918,038 discloses a mixed catalyst system, based on vanadium, to control the molecular weight distribution of the polyolefin.

Although such techniques have improved the processing characteristics of the polyolefin, the processing advantage has been largely offset by a corresponding decrease in one or more essential physical properties of the polyolefin. For example, the polyolefin resins obtained in accordance with U.S. Pat. No. 4,025,707 have good die swell characteristics, acceptable environmental stress cracking resistance (ESCR) and flow properties, but polymer densities are too low to provide the necessary stiffness for blown bottles. In addition, polyolefin produced in accordance with the catalysts of U.S. Pat. No. 4,560,733 have sufficiently high densities (0.960 and greater), but typically are deficient in their resistance to environmental stress cracking.

A catalyst system that utilized a blended support, wherein different grades of a particular type of support, such as silica or alumina, having a different average pore radius are blended, have failed to provide a polyolefin having a broad or bimodal molecular weight distribution. Theoretically, a catalyst prepared on such a blended support should provide a broad or bimodal molecular weight polyolefin because the differing average pore radii of the different support grades provide polyolefins of a different molecular weight. However, because such a blended support failed to provide a bimodal polyolefin, investigators have continued to seek a catalyst support that exhibits a bimodal pore radius distribution and that, when used as a catalyst support, provides a polyolefin with a broad or bimodal molecular weight distribution.

Several patents disclose that preparation of a bimodal alumina particle, or a bimodal silica-alumina particle. For example, Murata in U.S. Pat. No. 3,949,030 discloses a cellular fused silica having a bimodal closed cell structure produced from a mixture of silica and boron oxynitride. Heating the sili-caboron oxynitride mixture to the melting point of the silica decomposes the boron oxynitride, thereby releasing a gas that creates cells in the silica and providing a silica matrix that exhibits a bimodal pore diameter. Several other patents, for example, Leach U.S. Pat. No. 3,898,322; Kim et al. U.S. Pat. Nos. 4,257,922 and 4,294,685; and Bouge et al. U.S. Pat. No. 4,315,839, each disclose an alumina that exhibits bimodal pore diameter distributions. Such bimodal aluminas are useful as components of hydroprocessing catalysts.

R. Snel, in a series of four publications in *Applied Catalysts*, 11 p. 271-280 (1984); 12 p. 189-200 (984); 12 p. 347-357 (1984) and 33 p. 281-294 (1987), disclosed silica-alumina gels having a bimodal pore structure. Snel also disclosed the use of a nitrogen base as a pore regulating agent. The bimodal silica gel particle of the invention, on the other hand, is essentially free of alumina (e.g. includes less than about 5%, and preferably less than about 2%, alumina), does not include a pore regulating agent, and is prepared by a method that is substantially different from the method employed by R. Snel.

As previously stated, it would be highly desirable to produce a bimodal polyolefin directly in a single reactor, i.e., without the need to blend polyolefins having different molecular weight distributions in order to obtain the advantages of a bimodal polyolefin. It is even more highly desirable to provide a high activity polymerization catalyst that produces high quality polyolefins having a broad or bimodal molecular weight distribution. To achieve this goal, it would be desirable to provide a silica catalyst support wherein each silica xerogel particle exhibits a bimodal pore radius distribution. The present invention provides a silica xerogel particle that exhibits a bimodal pore radius distribution and provides catalysts that yield polyolefins having a broad or bimodal molecular weight distribution.

Therefore, the invention is directed to a silica gel particle than exhibits a bimodal pore radius distribution, and that is used as a support for a catalyst that yields polyolefins having broad or bimodal molecular weight distributions. The silica xerogel support is prepared from a silica hydrogel prepared by the method of the present invention. The silica hydrogel is prepared by first and second precipitations of the silica hydrogel from an aqueous solution, at two distinct pH values, to provide a silica hydrogel particle than exhibits a bimodal pore radius distribution. The difference in pore radius between a first average pore radius and a second average pore radius in the same silica xerogel particle is at least about 20 Å (angstroms), thereby demonstrating the bimodal properties of the silica hydrogel particle. Converting the silica hydrogel particle to a silica xerogel particle does not destroy the bimodal pore radius distribution of the silica gel particle.

In general, the bimodal silica gel of the invention is prepared by adding an aqueous silicate solution to an aqueous acid solution to precipitate a silica hydrogel in an acidic medium. After an aging step, an additional amount of the silicate solution is added to the aqueous mixture including the silica hydrogel until the pH of the aqueous mixture is raised to at least about 9. Then, an acid solution is added to the mixture having a pH of at least about 9 to precipitate additional silicate on the silica hydrogel in an alkaline medium. The average pore radius of the silica hydrogel precipitated in the first precipitation is different from the average pore radius of the silica hydrogel precipitated in the second precipitation. Accordingly, a silica hydrogel particle that has a bimodal pore radius distribution within a single particle, and that is essentially free of alumina, is provided. Upon further processing, the bimodal silica hydrogel is converted into a bimodal silica xerogel. The resulting bimodal silica xerogel then is useful as a support for a polymerization catalyst. The polymerization catalyst, such as a chromium-containing catalyst, provides a polyolefin that demonstrates a broad or bimodal molecular weight distribution.

The precipitation of a silica hydrogel by adding an aqueous silicate solution to an aqueous acid solution is disclosed in Stoewener U.S. Pat. No. 1,738,315. Stoewener discloses adding the silicate solution to a sufficient amount of acid solution to neutralize the silicate. Stoewener does not teach or suggest a second precipitation of the silicate, and does not teach or suggest controlling the pH in the precipitation steps to provide a bimodal silica hydrogel. Nozemack et al., in U.S. Pat. No. 4,780,446, disclose an alumina-silica cogel that includes from about 91.5 to about 94.5 percent by weight alumina and that has a wide pore size distribution. The cogel of Nozemack et al. is prepared by adding an aluminum sulfate solution, a sodium aluminate solution and sodium silicate solution to a water heel, and maintaining the pH of the mixture in the range of 7.6 to 8.4. After the addition of the ingredients to the water heel, additional sodium aluminate solution is added to the mixture to increase the pH of the mixture to 9.6 to 10.3. Nozemack et al. do not teach or suggest a second precipitation to provide a bimodal silica-alumina hydrogel, and Nozemack et al. do not teach or suggest a bimodal silica hydrogel particle that is essentially free of alumina, such as a bimodal silica hydrogel particle including less than about 5 wt. % alumina.

It is evident that a polyolefin exhibiting a broad or bimodal molecular weight distribution is desirable, or necessary, in several industrial applications. Attempts to provide such a polyolefin in a single reactor using a single catalyst, and thereby obviate the blending of polymers having a different molecular weight distribution, or of blending catalysts, has not been entirely successful. Therefore, the invention is directed to providing polyolefins having broad or bimodal molecular weight distributions from a single catalyst in a single reactor, wherein the catalyst support is a silica xerogel particle that is characterized by a bimodal pore radius distribution and is essentially free of alumina.

SUMMARY OF THE INVENTION

The invention is directed to a silica xerogel particle that exhibits a bimodal pore radius distribution. The silica xerogel particle is useful as a support for a polymerization catalyst, such as a chromium-containing catalyst, that produces polyolefins (e.g. polyethylene) having broad or bimodal molecular weight distributions. In particular, the silica xerogel particle is prepared from a silica hydrogel particle. The silica hydrogel particle is prepared by a method wherein two distinct precipitations of a silicate, under conditions of controlled pH, provide a silica hydrogel particle having a first average pore radius and a second average pore radius that differ by at least 20 Å.

In accordance with an important feature of the invention, a silica hydrogel particle having a bimodal pore radius distribution is prepared by the steps of:

(a) forming a silica hydrogel by neutralizing an aqueous solution of a silicate, wherein the silicate includes a cation selected from the group consisting of alkali metals, ammonium, and combinations thereof, by adding the silicate solution to a first aqueous acid solution to raise the pH of the first aqueous acid solution until the silica hydrogel is precipitated;

(b) aging the silica hydrogel of step (a) in the resulting solution of step (a) for a time sufficient to provide an aged silica hydrogel having a first average pore radius;

(c) adding silicate solution as defined in step (a) to the aged hydrogel and solution of step (b) to raise the pH thereof to at least about 9;

(d) neutralizing the resulting hydrogel and solution of step (c) by adding a second aqueous acid solution thereto to sufficiently lower the pH thereof to further precipitate the silicate as a hydrogel having a second average pore radius on the hydrogel of step (b); and, (e) heat-aging the resulting hydrogel and solution of step (d) for a sufficient time and at a sufficiently high temperature to fix the respective first and second average pore radii of the hydrogel of step (d), wherein the first average pore radius is different from the second average pore radius.

In accordance with another important feature of the invention, the silicate solution is added to the first aqueous acid solution in step (a) of the foregoing method over a time period of from about 5 minutes to about 20 minutes to raise the pH of the first acid solution to about 4.5 to about 7. Furthermore, after raising the pH to at least about 9 in step (c), a sufficient amount of the second aqueous acid solution is added in step (d) to lower the pH of the mixture of step (c) to about 5 to about 7. This method provides a silica hydrogel particle having a bimodal pore radius distribution, wherein the second average pore radius, resulting from the precipitation in an alkaline medium in step (d), is different from the first average pore-radius, resulting from the precipitation in an acidic medium in step (a), with the difference between the second average pore radius and the first average pore radius being at least about 20 Å.

In accordance with another feature of the invention, a silica xerogel exhibiting a bimodal pore radius distribution is prepared by a method wherein two distinct precipitations of a silicate, under conditions of controlled pH, first provide a silica hydrogel particle having a bimodal pore radius distribution. The silica hydrogel is suitably aged, then washed with water. Next, water is removed from the washed hydrogel to provide a silica xerogel having a bimodal pore radius distribution. The bimodal silica xerogel then can be calcined, and used as a support for an olefin polymerization catalyst. A further feature of the invention is to provide a polyolefin having a broad or bimodal molecular weight distribution from a chromium-based polymerization catalyst including a bimodal silica xerogel as a support.

The method of preparing a silica hydrogel and a silica xerogel having a bimodal pore radius distribution, the method of preparing an olefin polymerization catalyst including the bimodal silica xerogel as a catalyst support, and the polymerization of an olefin to produce a polyolefin having a broad or bimodal molecular weight distribution, and other aspects and advantages of the present invention, will become apparent from the following detailed description of the preferred embodiments taken in conjunction with the drawings.

BRIEF DESCRIPTION OF THE DRAWINGS

FIGS. 6 through 26 are plots of incremental pore volume (Des(Dr(r))) v. radius, in angstroms, illustrating the pore radius distribution of silica xerogel particles made either in accordance with the method of the invention or in comparative examples.

DETAILED DESCRIPTION OF THE PREFERRED EMBODIMENT

Figure 1:
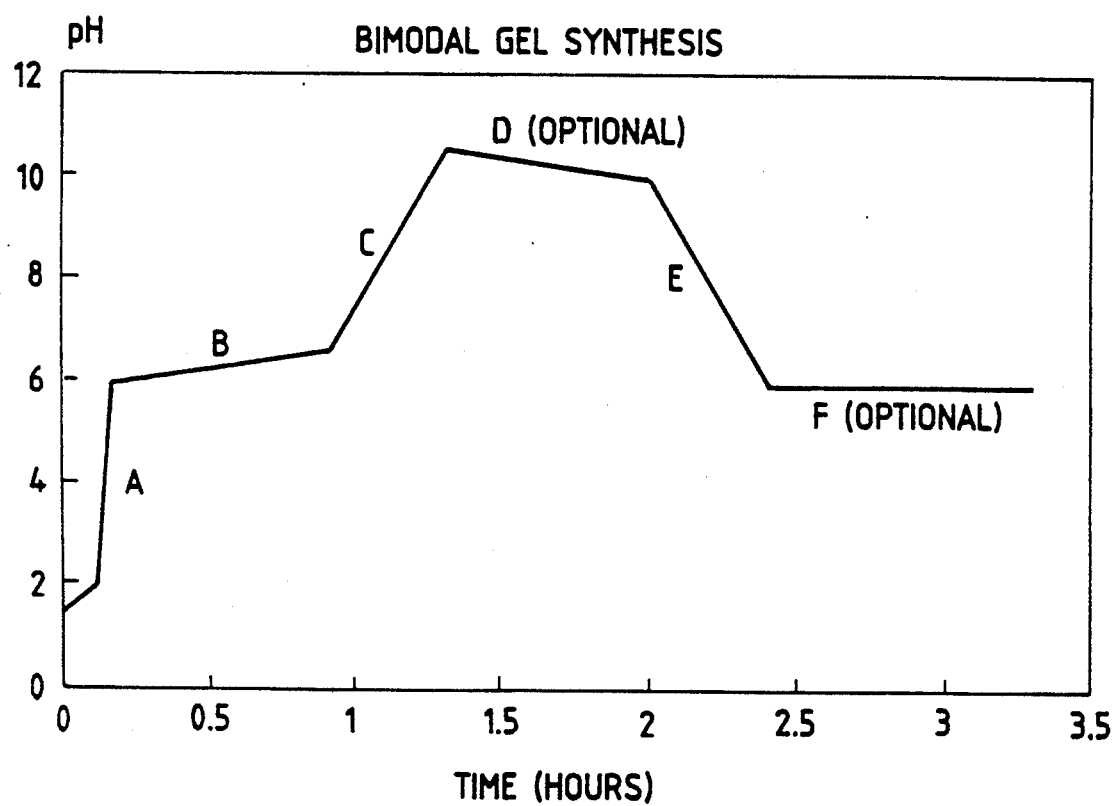
FIG. 1 is a graph of pH vs. time illustrating two distinct precipitations and the aging periods utilized in a method of preparing a silica hydrogel particle having a bimodal pore radius distribution.

The invention provides a bimodal silica xerogel particle that can be used as a catalyst support for a polymerization catalyst that yields polyolefins having broad or bimodal molecular weight distributions. The bimodal silica xerogel is a particle having two average pore radii that differ by at least about 20 Å. Accordingly, polyolefins having broad or bimodal molecular weight distributions can be produced without the need to blend polyolefins having different average molecular weights, and without the need to utilize two catalysts or two reactions that provide different molecular weight polyolefins.

In general, the bimodal silica xerogel particle is produced from a bimodal silica hydrogel particle. The bimodal silica hydrogel particle is produced by a method wherein an aqueous solution of a silicate (e.g. sodium silicate) first is added to a dilute acid solution (e.g. an about 2% to about 12% by weight sulfuric acid solution) until the pH of the acid solution is raised sufficiently (e.g. to about 6) to precipitate a silica hydrogel. The resulting mixture, including the silica hydrogel, then is allowed to age, (e.g. as for about one hour) to provide a silica hydrogel having a first average pore radius. Next, additional, unneutralized silicate solution is added to the mixture until the pH of the mixture is at least about 9; followed by the addition of a second dilute acid solution to the mixture having a pH of at least about 9 to reduce the pH of the mixture to, for example, about 5 to about 7. As the pH is reduced, additional silicate precipitates on the originally-precipitated silica hydrogel. The silica hydrogel precipitated in the second precipitation step has a larger average pore radius than the silica hydrogel precipitated in the first precipitation step, and accordingly a bimodal pore radius silica hydrogel is provided.

The bimodal silica hydrogel then is heat-aged at about 90° C. and pH about 6 to about 7. The bimodal silica hydrogel is converted to a bimodal silica xerogel first by water washing the bimodal silica hydrogel to reduce the sodium ion concentration of the silica hydrogel slurry to less than about 10 ppm (parts per million), filtering, washing (e.g. with acetone) and drying. The resulting bimodal silica gel product then is heated at about 100° F. for about two hours in a vacuum oven to provide a silica xerogel that has first and second average pore radii.

The bimodal silica xerogel is useful as a catalyst support for a chromium-based or other catalyst, wherein the catalyst provides polyolefins having broad or bimodal molecular weight distributions. In addition, the bimodal silica xerogel is useful in other standard applications for silica gels, such as, but not limited to, a catalyst per se, a support for a catalyst, selective adsorption, and other standard applications known to those skilled in the art.

Accordingly, it has been found that the inventive method of preparing a silica hydrogel provides a silica hydrogel particle, and subsequently a silica xerogel particle, having a bimodal pore radius distribution, wherein the difference between the first average pore radius and the second average pore radius is at least about 20 Å. The bimodal silica xerogel particle, when used as a support for a polymerization catalyst, provides polyolefins having broad or bimodal molecular weight distributions.

This result is new and unexpected in the art in view of previous attempts to provide a broad or bimodal molecular weight distribution polyolefin from a chromium-based catalyst that utilized a physical blend of two silica xerogel particles having a different average pore radius as the catalyst support. Such physically-blended catalysts provided a bimodal or broad molecular weight distribution polyolefin that exhibited good processing properties. However, the present bimodal silica xerogel provides a bimodal or broad molecular weight distribution polyolefin exhibiting much improved processing properties over polyolefins produced from a blended catalyst. These improved processing properties are achieved because the bimodal silica xerogel provides a more intimate mixing of polymer chains at the molecular level. Accordingly, a polymer synthesized from a catalyst including a bimodal silica gel particle of the present invention exhibits an improved environmental stress cracking resistance.

It has been found that particular parameters in the method of preparing the silica hydrogel particle of the present invention are important in providing a silica hydrogel particle exhibiting bimodal pore radius characteristics. These important parameters include the use of two distinct silica hydrogel precipitations, control of the pH, and aging periods after each precipitation. Therefore, in summary, silica hydrogel particles having a bimodal pore radius distribution can be prepared from a silicate by first precipitating the silicate in an acid medium, followed by aging the precipitated silica hydrogel to form the first average pore radius of the silica hydrogel particle; then precipitating additional silicate on the silica hydrogel particle in an alkaline medium to form the second average pore radius of the silica hydrogel particle. The bimodal silica hydrogel particle can be converted into a bimodal silica xerogel particle without destroying the bimodal properties of the silica hydrogel.

It has been theorized, but is not relied upon herein, that, after the pH is raised to at least about 9 by the addition of additional silicate, a portion of the surface of the first precipitated silica hydrogel is partially redissolved and thus prepares the surface of the silica hydrogel for further reaction. The second precipitation is performed in the alkaline medium that partially dissolves the surface of the first precipitated hydrogel.

In particular, the preparation of a bimodal silica hydrogel of the present invention is illustrated in FIG. 1, showing the pH ranges wherein the first and second silica hydrogel precipitations occur and the aging periods after each precipitation. From FIG. 1, the first step in the method of preparing a silica hydrogel having a bimodal pore size distribution includes precipitating a silicate from an aqueous solution by adding a silicate solution to an aqueous acid solution. This first silica hydrogel precipitation is identified in the graph of FIG. 1 as region A.

In this first precipitation, an aqueous solution of a silicate, including from about 10% to about 40% by weight of silica, as $SiO_2$, is utilized. In general, any water-soluble silicate can be used as long as the cation of the silicate can be rinsed from the silica hydrogel. If the cation is not sufficiently removed from the silica hydrogel, the silica hydrogel can undergo a pore collapse during high temperature activation. Usually, the silicate solution is an alkaline solution, and includes a silicate having a cation selected from the group consisting of an alkali metal, ammonium and combinations thereof. Examples of a useful silicate include, but are not limited to, sodium silicate, potassium silicate, lithium silicate, ammonium silicate and combinations thereof. Preferably, the silicate utilized in the method of the invention is sodium silicate, potassium silicate or a combination thereof. To achieve the full advantage of the present invention, the sodium silicate has a sodium oxide ($Na_2O$) to silicon dioxide ($SiO_2$) ratio in the range about 1:3 to about 1:3.75, and especially a ratio of about 1:3.22. The potassium silicate has a potassium oxide ($K_2O$) to $SiO_2$ ratio in the range of about 1:1.8 to about 1:3.3. In addition, the silicate solution is essentially free of alumina ($Al_2O_3$), said silicate solution including less than about 5%, and preferably less than about 2% by weight, based on the weight of $SiO_2$ in the silicate solution. To achieve the full advantage of the present invention, the silicate solution includes less than about 1% by weight $Al_2O_3$.

The aqueous solution of the silicate is added to an aqueous acid solution to raise the pH of the aqueous acid solution until a silica hydrogel is precipitated. In general, the aqueous acid solution is a dilute acid solution including from about 2% to about 12% by weight acid. Preferably, the acid solution includes from about 2% to about 6% by weight acid. However, it should be understood that this is a preferred range for the amount of acid in the aqueous acid solution taking into account practical volumes and sufficient acid strength. Amounts of acid in the aqueous acid solution below 2% by weight and above 12% by weight also are useful in the first precipitation reaction.

In addition, the identity of the acid included in the aqueous acid solution is not critical, as long as the acid has a sufficient strength to neutralize the alkaline silicate. Therefore, suitable acids include, but are not limited to, sulfuric acid, nitric acid, phosphoric acid, hydrochloric acid and combinations thereof. Preferably, sulfuric acid is used as the acid in the dilute acid solution, as it has the advantage of generating no corrosive fumes, and the sulfate anion is rinsed from the silica hydrogel easily.

The aqueous silicate solution is added to the acid solution slowly, such as over a time period of from about 5 minutes to about 20 minutes, and usually over a time period of from about 10 to about 15 minutes. The neutralization reaction is exothermic, with the reaction mixture temperature generally rising from ambient temperature to about 30° C. to about 35° C. In a case wherein the exothermic reaction causes the temperature to rise over about 40° C., the reaction mixture can be cooled externally to maintain the temperature below about 35° C. The addition of the silicate solution to the aqueous acid solution raises the pH of the acid solution, and the first silica hydrogel precipitation occurs in an acidic medium when the pH of the reaction mixture is about 4.5 or above, and preferably about 6 or above, such as about 6.3 to about 6.5. Essentially all of the available silicate is precipitated at a pH of about 6 or above. Generally from about 10% to about 80%, and preferably from about 20% to about 60%, by weight of the total silicate present in the bimodal silica hydrogel is precipitated in this first precipitation. In the subsequent second precipitation, conducted in an alkaline medium, the remainder of the silicate is precipitated on the silica hydrogel precipitated in the acidic medium.

After the first silica hydrogel is precipitated at a pH of about 4.5 or above, and preferably at about 6 or above, the reaction mixture, including the first precipitated hydrogel, is aged for a time period of from about 15 minutes to about 4 hours, and preferably for about 30 minutes to about 3 hours. The aging step is performed at ambient temperature, or slightly above ambient temperature if the exothermic neutralization reaction increased the temperature of the reaction mixture. This first aging step is identified in FIG. 1 as region B.

The first aging step, i.e. the second step in the method of preparing a bimodal silica hydrogel, is important because the aging step allows a partial condensation of the water associated with the silica hydrogel. However, the aging step is terminated before the silica hydrogel is completely condensed, otherwise the silica hydrogel particles become excessively hard and dense. In general, the aging step is of sufficient duration to provide a stable hydrogel, and is terminated before excessive settling of the silica hydrogel precipitate from the reaction solution occurs. The first aging step also effectively fixes the first pore radius distribution in the range of about 20 Å to about 150 Å, and effectively fixes the first average pore radius of the bimodal silica gel in the range of from about 40 Å to about 125 Å, and preferably in the range of about 50 Å to about 100 Å.

After the first aging step, an additional amount of the silicate solution is added at a uniform rate, and under agitation, to the mixture of the precipitated hydrogel and solution of pH about 4.5 to about 7 to raise the pH of the mixture to at least about 9, and preferably to at least about 10. This step of the present method is illustrated in FIG. 1 as region C. It has been theorized, but not relied upon herein, that the increase in pH partially resolubilizes the precipitated hydrogel and ruptures a portion of the silicon-oxygen bonds in the silica hydrogel and provides a number of silicon atoms having two hydroxyl group substituents. In effect, the increased pH opens the outer surface of the silica hydrogel and a pore structure develops on the outer surface. During the addition of the silicate solution, the pH of the mixture should not exceed a pH of about 11, or the previously precipitated silica hydrogel can be totally resolubilized. If the silicate addition causes a rise in pH above about 11, additional acid can be added to the mixture to reduce the pH to a suitable level.

After an optional aging period to allow the precipitated silica hydrogel to interact with the alkaline medium, such as to partially open the pore structure on the surface of the silica hydrogel, and illustrated in FIG. 1 as region D, the second silica hydrogel precipitation is achieved by adding a dilute aqueous acid solution to the mixture of precipitated silica hydrogel and silicate solution having a pH of at least about 9. The reduction in pH resulting from the acid addition to the mixture is illustrated in FIG. 1 as region E. The dilute aqueous acid solution generally includes from about 2% to about 12%, and preferably from about 4% to about 8%, by weight acid. The acid solution is added at a uniform rate, under agitation, to reduce the pH of the reaction mixture.

The second silica hydrogel precipitation occurs at a pH of between about 8 and about 9, and usually between about 8.3 and about 8.7. The second precipitation reaction is continued until precipitation is complete, generally by adding the acid solution until a pH of about 6 is attained. The second silicate precipitation occurs on particles of silica hydrogel that were formed in the first precipitation, and provides a second average pore radius of the silica hydrogel that differs from the first average pore radius of the silica hydrogel of the first precipitation, thereby providing a bimodal silica hydrogel particle. The second pore radius distribution generally is in the range of about 50 Å to about 500 Å.

After the second precipitation step, the mixture of the precipitated hydrogel and solution of about pH 6 optionally can be aged at ambient temperature prior to heat-aging the silica hydrogel and solution. This second optional aging step is illustrated in FIG. 1 as region F. This optional aging step can continue for a time period up to 24 hours, and helps condense the silica hydrogel to provide a more dense silica gel particle.

After the second precipitation step and the second optional aging step, the silica hydrogel and the solution of about pH 6 are heat-aged, under mild agitation, at a temperature of about 70° C. to about 100° C., and preferably from about 80° C. to about 95° C., for at least 0.5 hour, and preferably from about 1 to about 2 hours. The heat-aging step serves to temper the bimodal silica hydrogel by giving the silica hydrogel sufficient structural integrity for a subsequent high temperature activation, and also serves to fix the first and second average pore radii of the bimodal silica hydrogel.

The above-described method provides a silica hydrogel particle having a bimodal pore radius distribution, wherein the first pore radius distribution is in the range of about 20 Å to about 150 Å and the second pore radius distribution is in the range of about 50 Å to about 500 Å, and wherein the average pore radius of the silica hydrogel precipitated in the second alkaline precipitation generally is greater than the average pore radius of the silica hydrogel precipitated in the first acidic precipitation. However, it is envisioned that a particular set of precipitation conditions can provide a bimodal silica gel particle having a first average pore radius that is greater than the second average pore radius. In general, the bimodal silica hydrogel particle has a first average pore radius of about 40 Å to about 125 Å, and a second average pore radius of about 60 Å to about 450 Å. Usually, the difference between the second average pore radius and the first average pore radius is at least about 20 Å.

After heat-aging the silica hydrogel particle to fix the first and second average pore radii, the silica hydrogel is converted to a silica xerogel. First, the solution of pH about 6 is decanted from the bimodal silica hydrogel. The slurry of bimodal silica hydrogel particles then is washed with water to remove the cations from the silica hydrogel slurry, for example to remove sodium ions such that less than about 10 ppm (parts per million) sodium ion remains in the bimodal silica hydrogel slurry. Next, water is removed from the silica hydrogel particles, such as by rinsing with a water-miscible organic liquid, like, for example, a low molecular weight ketone, a low molecular weight alcohol, or a combination thereof, e.g. acetone, methanol, ethanol or isopropyl alcohol, to displace water from the hydrogel. Rinsing with the organic liquid is continued until less than 1% by weight water remains in the bimodal silica hydrogel. The resulting bimodal silica gel product then is dried under reduced pressure, preferably at a low temperature, such as at from about 80° C. to about 110° C. to provide a bimodal silica xerogel. The resulting bimodal silica xerogel has a nitrogen pore volume in the range of about 1.5 to about 3 cc/g, a surface area in the range of about 200–500 $m^2/g$, and a bimodal pore radius distribution.

As an alternative to rinsing the silica hydrogel particles with an organic liquid to displace water from the silica hydrogel, other methods are available to remove water from the silica hydrogel without destroying the pore structure of silica hydrogel. In each method, water is removed from the washed silica hydrogel in a manner that avoids substantial collapse of the pores of the silica hydrogel. For example, water also can be removed by azeotropic distillation with a compound capable of forming an azeotrope with water, such as ethyl acetate or benzene.

Another method entails washing the silica hydrogel with a water-miscible organic liquid or mixture of liquids to remove about 90 to about 95% of the water, and then treating the partially dehydrated silica gel with a ketal of the formula $RC(OR)_2R$, wherein R is the same or different and is an alkyl group including one to five carbon atoms, plus a trace of acid, whereby residual water is completely and irreversibly removed by a chemical reaction. In yet another method, water is removed by contacting the silica hydrogel directly with a sufficient amount of ketal in the presence of a trace amount of acid as a catalyst. Examples of suitable ketals include, but are not limited to, 2,2-dimethoxypropane, 2,2-dimethoxybutane, 2,2-diethoxypropane, 2-methoxy-2-ethoxypropane and similar ketals. Each of the above-described water removal methods is disclosed in Dombro et al. U.S. Pat. No. 4,246,137; Dombro U.S. Pat. No. 4,279,780; and Dombro et al. U.S. Pat. No. 4,791,089, each incorporated herein by reference.

The bimodal silica xerogel then has a chromium catalyst deposited thereon, and usually, is subjected to a high temperature activation. In general, the bimodal silica xerogel incorporates a chromium catalyst because chromium catalysts provide polyolefins having a broad molecular weight distribution. In contrast, the titanium-type Ziegler catalysts produce polyolefins having a very narrow molecular weight distribution.

To demonstrate the ability of the above-described method to provide a bimodal silica hydrogel and xerogel, several silica gels were prepared, under varying method parameters. It has been shown that a bimodal silica xerogel has been prepared, wherein the bimodal silica xerogel has a pore volume of over 2 cc/g and a surface area of 200 to 500 $m^2/g$. The bimodal silica xerogel was coated with a chromium-containing catalyst, such as chromium acetoacetonate or chromium phosphoryl complex, was activated and was used in a polymerization reaction to produce a bimodal or broad molecular weight distribution polyethylene.

In summary, from the following Examples and Comparative Examples, it was found that a bimodal silica hydrogel was prepared by conducting two distinct hydrogel precipitations in the same batch, but under different conditions. The first precipitation occurs in an acidic medium by adding an aqueous sodium silicate solution to a dilute sulfuric acid solution. After a one hour aging period, additional sodium silicate solution is added to the mixture to bring the pH to at least about 9. Then, a dilute acid solution is added to precipitate the second portion of the hydrogel in an alkaline medium and to neutralize the slurry. The inventive method has been performed both in a stirred, low shear vessel and in a high shear reactor. In particular, the following Examples and Comparative Examples demonstrate that:

- high shear or low shear agitation can be used to provide a bimodal silica hydrogel;
- two silicate precipitations in the same batch, under conditions of controlled pH, provide a bimodal silica gel;
- the silica hydrogel is aged for at least 15 minutes after the first precipitation to provide the first average pore size distribution;
- between the first and second precipitations, additional silicate salt is added until the mixture attains a pH of at least about 9;
- acid concentrations between about 2% and about 12% by weight can be used, with a 2% by weight acid concentration being preferred for the first precipitation and a 4% by weight acid concentration preferred for the reminder of the process; and
- the bimodal silica hydrogel can be heat-aged essentially immediately after the second precipitation or after an overnite aging period; however, a bimodal silica hydrogel having a higher pore volume is obtained when the bimodal silica hydrogel is heat-aged essentially immediately after the second precipitation.

Each of the bimodal silica xerogels of the following Examples was prepared by the general method described in Example 1. As will be discussed more fully hereinafter in individual Examples and Comparative Examples, various parameters were changed to determine the effect of that parameter on the bimodality of the silica xerogel.

EXAMPLE 1

GENERAL METHOD OF PREPARING THE SILICA XEROGELS OF EXAMPLES AND COMPARATIVE EXAMPLES 2 THROUGH 19

A sufficient amount of an aqueous acid solution including from about 2% to about 12% by weight sulfuric acid is added to a reaction vessel. The acid solution is agitated, and a sodium silicate solution then is metered into the agitated acid solution. At the onset of silica hydrogel precipitation, i.e. the first gel point, the addition of sodium silicate solution, and agitation, are stopped for an approximately one hour aging period.

After aging, agitation is resumed, then addition of the silicate solution to the reaction vessel is resumed. If necessary, a dilute acid solution also is added to control the maximum pH of the resulting slurry below about 11. When the entire amount of the sodium silicate solution has been added to the slurry, an aqueous acid solution including from about 2% to about 12% by weight sulfuric acid is added to the reaction vessel until the second precipitation point is reached at about pH 8 to 9. The slurry in the reaction vessel then is essentially completely neutralized by adding additional acid solution until the contents of the reaction vessel attain a pH of between about 5 and about 7. After an appropriate hold time specified for that particular Example or Comparative Example, the slurry is heat-aged by heating the slurry to about 90° C. and maintaining the slurry at about 90° C. for about one hour while controlling the at about 6.5.

The heat-aged slurry including the silica hydrogel is washed with water to remove the sodium sulfate by-product by decanting successive water washings until the sodium ion in the water washings is less than about 10 ppm. The water slurry then is filtered to remove the excess water. Next, the silica hydrogel cake is washed with acetone to displace the water in the pores of the bimodal silica. The acetone washings are continued until the resulting bimodal silica gel product includes less than 1% by weight water, i.e. the acetone wash has a specific gravity of 0.793 or less. The acetone slurry then is filtered, and the recovered bimodal silica gel product is dried in a vacuum oven for two hours at 110° C. and 28 in. Hg (inches mercury) vacuum. A sample of the resulting bimodal silica xerogel is analyzed for pore volume, surface area and pore radius distribution after heating the silica xerogel at about 1000° F. for about 4 hours.

The pore radius distribution of the silica xerogel was determined on a porosimeter. To demonstrate that a porosimeter detects a silica xerogel having a bimodal pore radius distribution, dry mixtures of commercially-available silica xerogels having different average pore radius distributions were prepared, then tested on the porosimeter. The silica xerogels were tested in accordance with a standard procedure, ASTM Method D 4641 Pore Size Distribution of Catalysts from Nitrogen Desorption Isotherms, that is well known to those skilled in the art. The test results were plotted on graphs of pore radius (in angstroms) versus incremental pore volume (Des(Dr(r))) to provide a visual depiction of the pore radius distribution of the tested silica gel.

Figure 2:
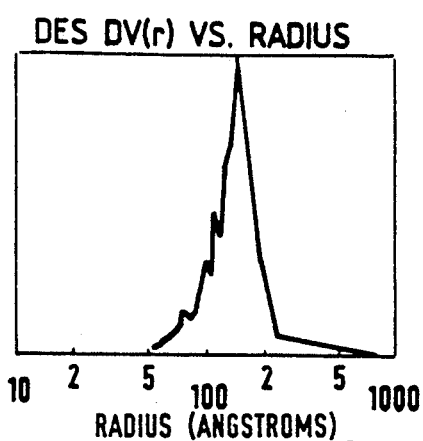
FIGS. 2 through 5 are plots of incremental pore volume (Des(Dr(r))) v. radius, in angstroms, illustrating the pore radius distribution of a physical blend of two silica xerogels having different pore radius distributions.
Figure 3:
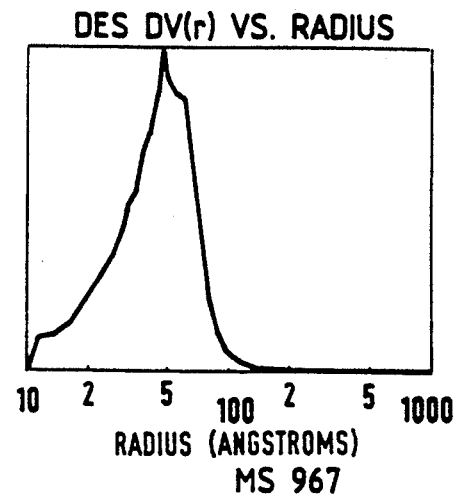
Figure 4:
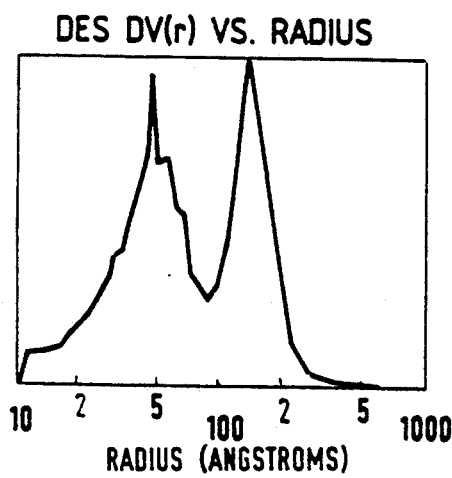
Figure 5:
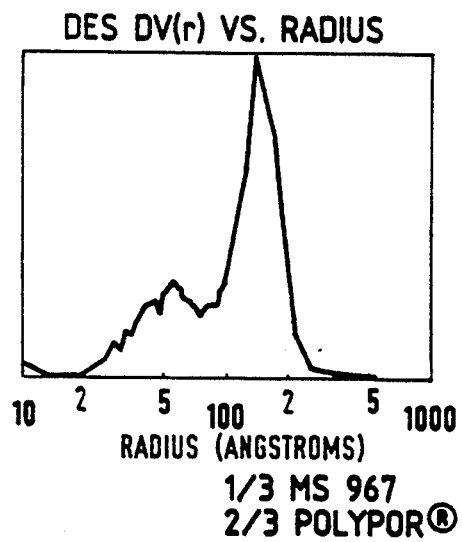

For example, FIG. 2 shows the average pore radius distribution of the commercial silica gel, POLYPOR ® Silica Gel, available from USI Division, Quantum Chemical Corp., New York, N.Y. and having an average pore radius of about 150 Å. Similarly, FIG. 3 shows the average pore radius distribution for the commercial silica gel, MS-967, available from Davison Chemical Div., W.R. Grace and Co., Baltimore, Md., and having an average pore radius of about 50 Å. FIG. 4 shows that a blended mixture including 1 part POLYPOR ® Silica Gel and 2 parts MS-967, by weight, when tested on a porosimeter, gave pore radius distribution peaks identical to the peaks of the individual silica xerogels. FIG. 5 shows similar results for a mixture including 2 parts POLYPOR ® Silica Gel and 1 part MS-967 by weight. FIGS. 4 and 5 are illustrative of a silica xerogel that exhibits a bimodal pore size distribution. However, it should be understood that in FIGS. 4 and 5 the difference in average pore radius occurs between individual silica xerogel particles, whereas a bimodal silica xerogel prepared by a method of the present invention has two different average pore radii in the same silica xerogel particle. It also should be understood that a blend of silica xerogels, as illustrated in FIGS. 4 and 5, when used as a catalyst support for a chromium-based olefin polymerization catalyst, produce a polyolefin that exhibits a broad or bimodal molecular weight distribution, but the polymer chains are not commingled at a molecular level. In contrast, a bimodal silica xerogel of the present invention did provide a polyolefin having a broad or bimodal molecular weight distribution and having polymer chains commingled at the molecular level, and therefore exhibited improved processing properties, such as melt flow.

EXAMPLE 2

A bimodal silica xerogel prepared by the method of the invention, as outlined in Example 1, is illustrated in FIGS. 6 through 10. In preparing this particular bimodal silica xerogel, dilute sodium silicate (25% as $SiO_2$) was added to a heel of aqueous 4% by weight sulfuric acid until a precipitate, or gel, formed at about pH 6. The addition of the sodium silicate solution, and agitation, were stopped, then after a one hour aging period, the remainder of the sodium silicate solution was added to the aged slurry with agitation. The pH of the slurry was about 10.4. Next, a 4% by weight sulfuric acid solution was metered into the slurry and the pH was reduced from about 10.4 to 6.5. The second precipitate, or gel, formed at a pH of about 8.3. The resulting slurry was heat-aged after a 24 hour hold period at ambient temperature.

Figure 6:
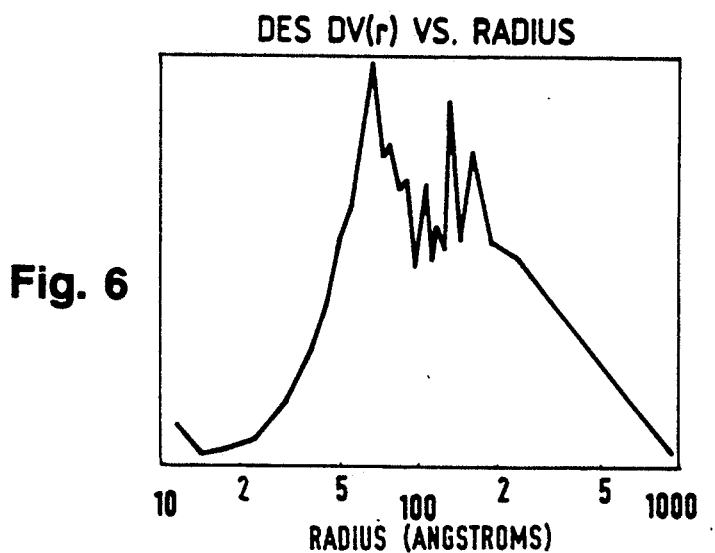
Figure 7:
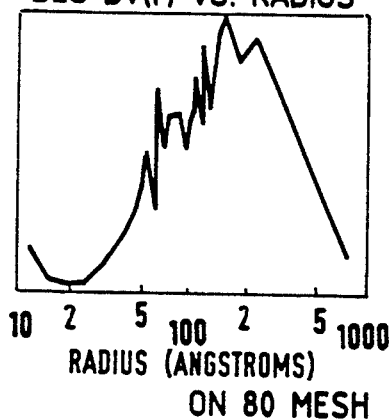
Figure 8:
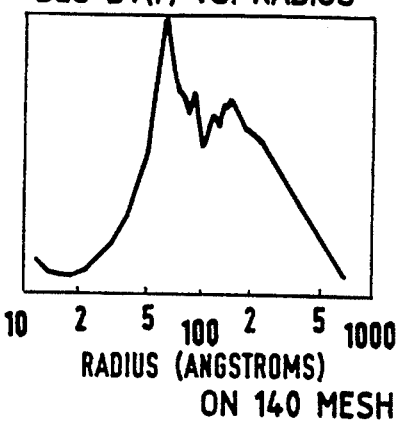
Figure 9:
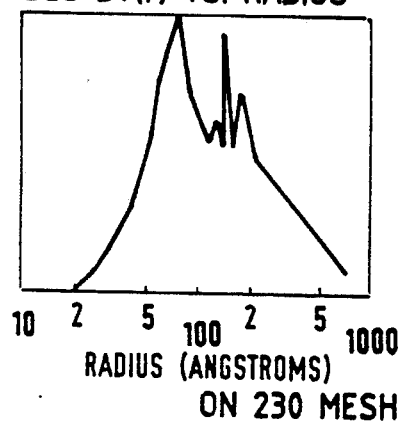
Figure 10:
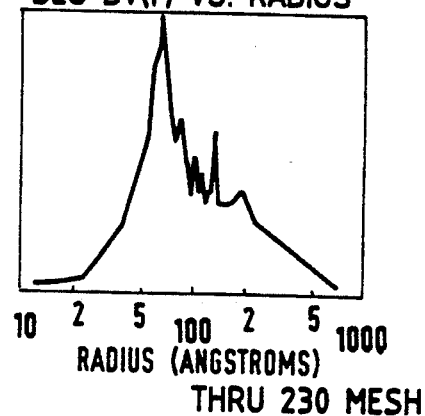

In particular, FIG. 6 is a pore radius curve, determined by ASTM Method D 4641, for the bimodal silica xerogel of Example 2 and shows a bimodal pore radius distribution with the two major average pore radius distribution peaks having a substantial separation of about 75 Å. Sieve fractions on an 80 mesh, 140 mesh, 230 mesh and through a 230 mesh screen, and illustrated in FIGS. 7 through 10 respectively, show that the silica xerogel of Example 2 exhibits a bimodal pore size distribution in all particle sizes. Accordingly, the method of the present invention provides a bimodal silica xerogel having a first average pore radius of about 75 Å and a second average pore radius of about 150 Å.

EXAMPLE 3

Figure 11:
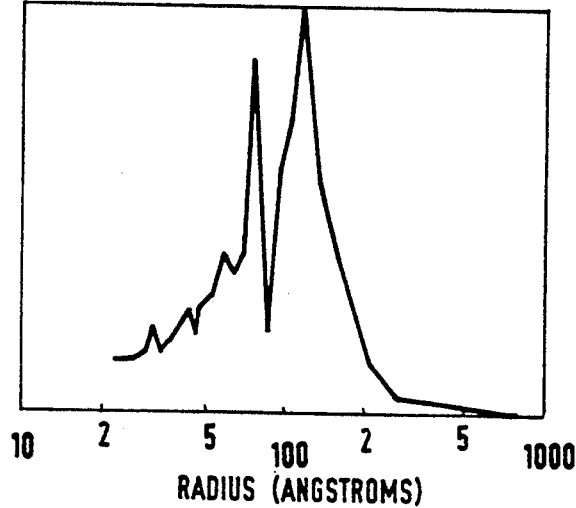

A silica xerogel was prepared in an identical manner to the silica gel of Example 2, except a high shear mixer was utilized, and the 24 hour hold period before the onset of heat-aging was eliminated. In this Example, heat-aging was started essentially immediately after the second precipitation was complete. FIG. 11 illustrates the pore radius distribution curve for the silica xerogel of Example 3, showing two sharp peaks at 80 Å and 130 Å. Accordingly, the silica xerogel of Example 3 has a bimodal pore radius distribution. In addition, the silica xerogel of Example 3 exhibited a pore volume of 2.65 cc/g (cubic centimeter/gram) and a surface area of 554 $m^2/g$ (square meter/gram).

COMPARATIVE EXAMPLES 4 AND 5

Silica xerogels were prepared in an identical manner to the silica xerogel of Example 2, except the aging step after the first silica hydrogel precipitation was eliminated. Although, the silica xerogels of Examples 4 and 5 showed two average pore radii, the average pore radii were not sufficiently different to provide a bimodal silica gel. The pore radius distribution curves for the silica xerogels of Examples 4 and 5 are illustrated in FIGS. 12 and 13, respectively. The following Table 1 illustrates the differences in the method of preparing the silica xerogels of Examples 2, 4 and 5, and the differences in the resulting silica xerogels.

TABLE 1

| Example No. | First Hydrogel Precipitate (% of Total Precipitate) | First Hydrogel Precipitate Age Time | P.V. (cc/g) | Bimodal |
|---|---|---|---|---|
| 2 | 33% | 53 min. | 2.02 | yes |
| 4 | 37% | 0 | 2.45 | no |
| 5 | 33% | 0 | 2.43 | no |

Therefore, it was found that the aging period after the first silica hydrogel precipitation was essential for bimodality. The aging period allows sufficient time for syneresis, wherein the particle of the precipitated silica hydrogel condenses and frees water from the precipitated silica hydrogel. The aging period allows the pores of the precipitated silica hydrogel to shrink, and thereby a smaller average pore radius distribution is formed in the silica xerogel.

COMPARATIVE EXAMPLE 6

A silica xerogel was prepared in an identical manner to the silica xerogel of Example 2, except the second precipitation step was omitted. Therefore, after the first silica hydrogel precipitate was formed and held one hour, the silica hydrogel was heat-aged, washed, and converted into a silica xerogel. The pore radius distribution curve of the silica xerogel of Example 6 showed that the silica xerogel had a pore radius peak at about 80 Å, illustrating that the first silica hydrogel precipitate provides the smaller average pore radius distribution, whereas the second silica hydrogel precipitate provides the larger average pore radius distribution. The pore radius distribution curve for the silica xerogel of Example 6 is illustrated in FIG. 14.

EXAMPLE 7

A silica xerogel was prepared in an identical manner to the silica xerogel of Example 2, except that for the first precipitation the sodium silicate solution was added to a heel that included 2% by weight sulfuric acid rather than 4% by weight acid and was prepared in a high shear reactor. The resulting silica hydrogel was softer and more easily dispersed, and accordingly this method of precipitation is a preferred embodiment of the present invention. FIG. 15 illustrates the pore radius distribution for the silica xerogel of Example 7, showing a bimodal silica xerogel having widely separated major pore radius peaks at 60 Å and 170 Å radii.

EXAMPLES 8-10

Figure 16:
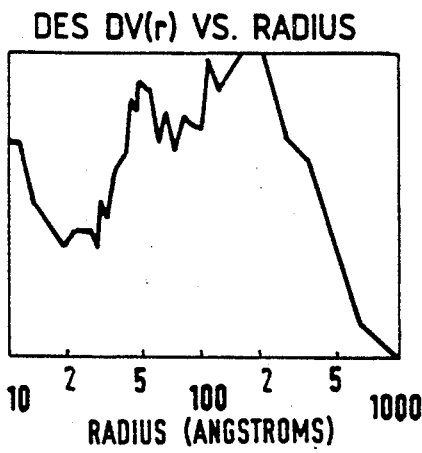
Figure 17:
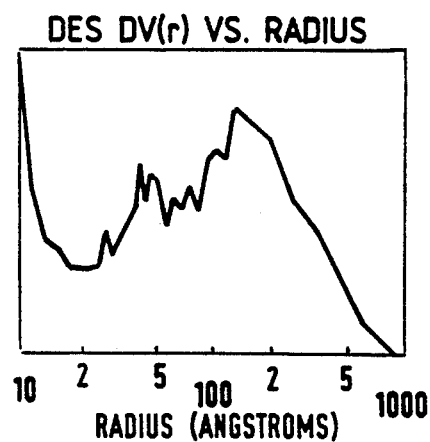
Figure 18:
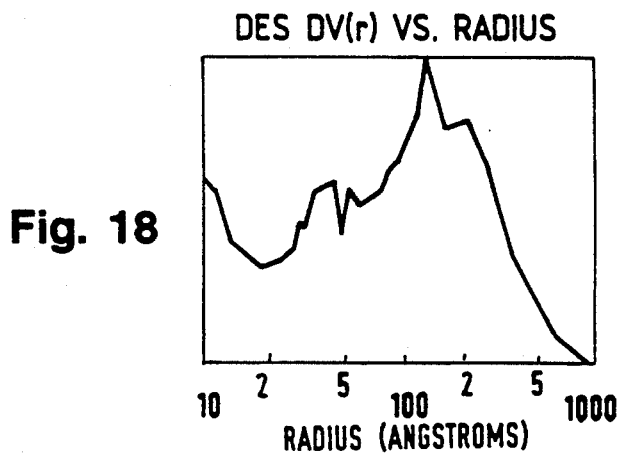

Silica xerogels were prepared in an identical manner to the silica xerogel of Example 2, however the effect of varying the hold time after the second silica hydrogel precipitation, and prior to heat-aging the silica hydrogel, on pore volume was investigated. Each of the silica xerogels of Examples 8-10 demonstrated a bimodal pore radius distribution, with the greatest pore volume and surface area found when the heat-aging step was performed without a holding period after the second precipitation step. For example, the bimodal silica xerogel of Example 8, with no holding period after the second silica hydrogel precipitation, had a pore volume (P.V.) of 2.47 cc/g and a surface area (S.A.) of 360 m$^2$/g; the bimodal silica xerogel of Example 9, with a 1.5 hour holding period after the second silica hydrogel precipitation, had a P.V. of 1.91 cc/g and an S.A. of 278 m$^2$/g; and the bimodal silica xerogel of Example 10, with a 24 hour holding period after the second silica hydrogel precipitation, had a P.V. of 1.80 cc/g and an S.A. of 266 m$^2$/g. The pore radius distributions of the bimodal silica xerogels of Examples 8-10 are illustrated in FIGS. 16-18, each showing the bimodal pore radius distribution of the silica xerogel.

EXAMPLE 11

Figure 19:
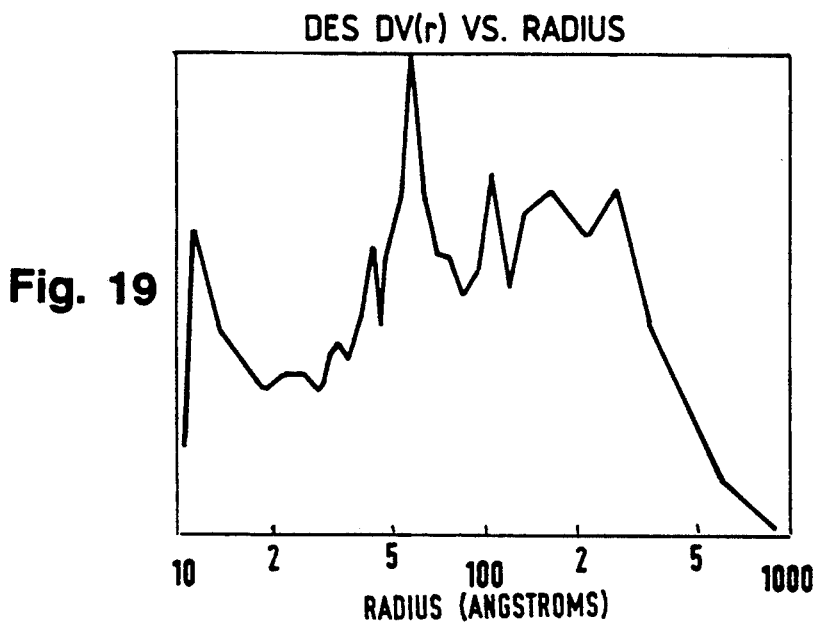

A silica xerogel was prepared in an identical manner to the silica xerogel of Example 2, except the silica xerogel of Example 11 was aged for 1.5 hours rather than 24 hours after the second silica hydrogel precipitation step and prior to heat aging. The resulting silica xerogel of Example 11 had a bimodal pore size distribution with a major small pore distribution radius peak at 60 Å, and wide pore radius distribution peaks for the large pore radii of 110 Å to 280 Å. This pore radius distribution is similar to the pore radius distribution of the silica xerogel of Example 2 that had wide pore radius distribution peaks from 110 Å to 170 Å. The pore radius distribution of the silica xerogel of Example 11 is illustrated in FIG. 19.

EXAMPLES 12-14

Figure 20:
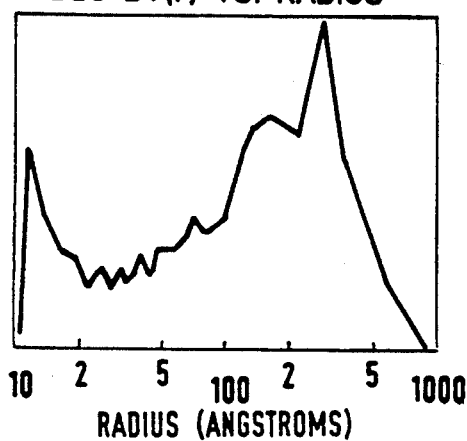
Figure 21:
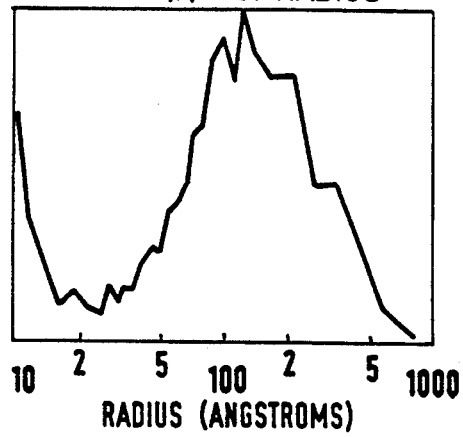

Silica xerogels were prepared in an identical manner to the silica xerogel of Example 2, except the pH of the slurry after the first precipitation was raised to different values before the acid addition provided the second precipitation. In Example 2, the silica xerogel was made under low shear conditions, with a maximum pH of 10.5 and no holding time before the acid addition effected the second silica hydrogel precipitation. The plot of FIG. 20 shows that the silica xerogel of Example 12 had a bimodal pore radius distribution. In Example 13, the silica xerogel was made under low shear conditions, with a maximum pH of 10.3 and a 24 hour holding time before the acid addition effected the second precipitation. The bimodality of the silica xerogel of Example 13 is illustrated in the plot of FIG. 21.

Figure 22:
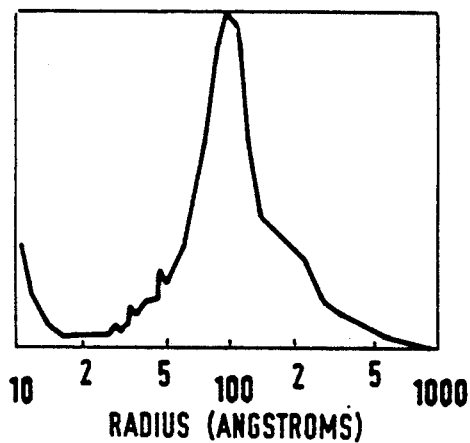

The silica xerogel of Example 14 was formed under high shear conditions, with a maximum pH of 10.7 and a 24 hour holding time before the acid addition effected the second silica hydrogel precipitation. The graph in FIG. 22 shows that the bimodality of the silica xerogel essentially has been destroyed. The silica xerogel of Example 14 did not demonstrate bimodality because during the conversion of the silica hydrogel to the silica xerogel, water was removed from the pores of the silica gel particles by excessive filtering rather than by acetone displacement. From the following TABLE 2, it is observed that the silica hydrogels of Examples 3 and 14 were prepared under essentially identical conditions. However, the silica xerogel of Example 3 exhibited bimodality, whereas the silica zerogel of Example 14 did not exhibit bimodality. The silica xerogel of Example 14 failed to exhibit bimodality because the silica hydrogel of Example 14 was filtered to dryness when filtering water from the hydrogel slurry, thereby removing water from the pores in the hydrogel and causing pore collapse. Accordingly, the pore volume and surface area of the silica xerogel of Example 14 is substantially less than the xerogel of Example 3, and, bimodality also was destroyed.

Therefore, it has been demonstrated that a water removal method that avoids pore collapse is important in providing a bimodal silica xerogel of the present invention. The water removal methods previously discussed each gently remove water from the silica hydrogel in order to retain pore integrity, and therefore bimodality. This is accomplished by utilizing one of the above described methods that avoid conditions during water removal wherein the surface tension of the water being removed becomes sufficiently strong to collapse the pores due to capillary action thereon.

EXAMPLES 15–16

Figure 23:
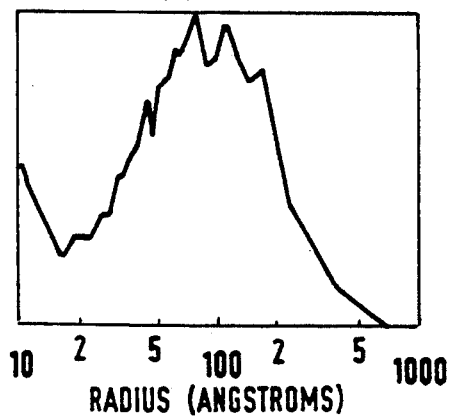
Figure 24:
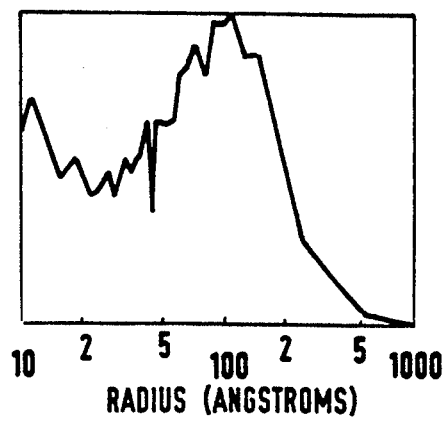

The xerogels of Examples 15 and 16 were xerocogels including silica and titanium, and made in accordance with the method outlined in Example 1. The xerocogel of Example 15 was made under conditions of low shear, whereas the xerocogel of Example 16 was made under high shear conditions. The titanium compound, present in a minor amount of the xercogel, was titanium sulfate, e.g. $TiSO_4 \cdot H_2SO_4 \cdot 8H_2O$. The xerocogels of Examples 15 and 16, as illustrated in FIGS. 23 and 24, have a broad pore radius distribution, with bimodal characteristics.

Other suitable titanium-containing compounds useful in the preparation of a silica-titanium xerocogel that exhibits a bimodal pore size distribution include an alkali metal titanium oxalate, like potassium titanium oxalate and ammonium titanium oxalate, i.e. $K_2TiO(C_2O_4)_2 \cdot 2H_2O$ and $(NH_4)_2TiO(C_2O_4)_2 \cdot 2H_2O$, respectively. Furthermore, in place of or in addition to the titanium, either zirconium or vanadium, or a combination thereof, can be incorporated into a bimodal xerocogel of the present invention. Also envisioned is a xerotergel, including a combination of silica with titanium, vanadium and zirconium, that demonstrates a bimodal pore size distribution. A suitable zirconium-containing compound is an alkali metal or an ammonium zirconium oxalate, like ammonium tetraoxalatozirconate(IV) tetrahydrate. A suitable vanadium-containing compound is a vanadium trihalide compound, a vanadium pentahalide compound, or a vanadium oxyhalide compound, like vanadium pentachloride, vanadium trichloride, or vanadium oxytrichloride.

In every case, the titanium and/or zirconium and/or vanadium-containing compound is present in a minor amount compared to the silica. Preferably, when a xerocogel or a xerotergel is used to support a chromium catalyst, the sum of the zirconium and titanium and vanadium concentrations with respect to silica, as $SiO_2$, is about 5 wt. % or less. The titanium and/or zirconium and/or vanadium-containing compounds are coprecipitated with the silicate salt. Such coprecipitations result in an intimate incorporation and distribution of the titanium and/or zirconium and/or vanadium into the bulk of the silica. Zirconium oxalate compounds, when coprecipitated in a silica hydrogel, provide advantages as catalyst supports for olefin polymerizations because the zirconium preserves the pore structure of the calcined xerocogel and provides resins having relatively high melt indexes (i.e. relatively low molecular weights), and does not adversely effect the bimodal pore radius distribution of the xerogel.

To summarize, TABLE 2 lists the properties of the silica xerogels Examples 2 through 16, including bimodal properties, pore volume and surface area, and various parameters used in the preparation of the particular silica xerogel.

TABLE 2

| Example No. | Bimodal Properties | Agitation Shear | First Precipitation Aging Time (in minutes) | Second Hold Time and Max. pH (hours/pH) | Hold Time For Heat Aging (Hours) | P.V.[1] (cc/g) | S.A.[2] (m²/g) |
| --- | --- | --- | --- | --- | --- | --- | --- |
| 2 | Yes | Low | 53 | 0/10.35 | 24 | 2.02 | 274 |
| 3 | Yes | High | 53 | 24/10.7 | 0 | 2.65 | 554 |
| 4 | No | Low | 0 | 0/>10 | 1 | 2.45 | 284 |
| 5 | No | Low | 0 | 0/>10 | 1.5 | 2.43 | 297 |
| 6 | No | Low | 60 | — | 1 | 2.13 | 485 |
| 7 | Yes | High | 70 | .25/>10 | 24 | 2.31 | 375 |
| 8 | Yes | Low | 56 | 0/>10 | 0 | 2.47 | 360 |
| 9 | Yes | Low | 66 | 0/>10 | 1.5 | 1.91 | 278 |
| 10 | Yes | Low | 66 | 0/>10 | 24 | 1.80 | 266 |
| 11 | Yes | Low | 61 | 0/>10 | 2 | 1.72 | 251 |
| 12 | Yes | Low | 61 | 0/10.5 | 0 | 1.29 | 154 |
| 13 | Yes | Low | 60 | 24/10.3 | 0 | 1.47 | 195 |
| 14 | No | High | 56 | 24/10.7 | 0 | 1.94 | 289 |
| 15 | Broad[3] | Low | 60 | 0/>10 | 24 | 1.30 | 216 |
| 16 | Broad[3] | High | 60 | 5 minutes/>10 | 24 | 1.29 | 235 |
| 18 | Yes | Low | 0 | — | — | 2.37 | 639 |
| 19 | Yes | Low | 57 | 0/>10 | 1.5 | 1.93 | 264 |

[1] Pore volume;
[2] Surface area; and
[3] Multiple peaks indicating bimodal characteristics.

As stated above, a bimodal silica xerogel of the invention can be used as a support for an olefin polymerization catalyst. Preferably, the catalyst is a chromium-based catalyst. Such chromium-based catalysts provide a broad molecular weight distribution polyolefin, and are particularly useful in the polymerization of a 1-olefin (e.g. ethylene), having no branching nearer the carbon-carbon double bond than the 4-position. Furthermore, the chromium-based catalyst can be used in the homopolymerization of such a 1-olefin or in the copolymerization of two or more such 1-olefins.

The bimodal silica xerogels of the invention also exhibit other advantageous properties desired in a catalyst support. For example, the present bimodal silica xerogels generally have a pore volume of about 2 cc/g or greater. A silica xerogel support having a pore volume of greater than 2 cc/g are referred to as high pore volume silica supports, and are well-known in the art as a suitable catalyst support. Especially useful high pore volume silica supports have a pore volume from 2.1 cc/g to 2.9 cc/g. In addition to exhibiting a bimodal radius distribution and a pore volume of greater than about 2 cc/g, the silica xerogel particles of the present invention also have a surface area in the range of about 200 to about 500 m$^2$/g. Such a surface area is regarded as desirable in a catalyst support material. To achieve the full advantage of the present invention, the bimodal silica xerogel of the present invention is calcined at about 400° C. to about 1000° C. for several hours, e.g. up to about 12 hours, after the active catalyst component, such as chromium(III)acetylacetonate, is deposited on the bimodal silica xerogel support. Calcining however is not necessary, and useful catalysts are obtained when the calcining step is omitted.

A chromium-based olefin polymerization catalyst, including a bimodal silica xerogel particle of the invention as a support, provides polyolefins, and especially polyethylenes, that exhibit a broad or bimodal molecular weight distribution. Such polyolefins are especially useful in blow molding applications, and now can be produced without the need to blend polyethylene resins of different average molecular weights; without the need to blend two or more catalysts; and without the need to perform two or more polymerization reactions.

As stated above, the bimodal silica xerogel particles of the invention are especially useful as the support material for a chromium-based catalyst. The chromium compounds useful as the active catalyst component of the polymerization catalyst include any chromium-containing compound capable of interacting with the surface hydroxyl groups of the bimodal silica xerogel particle. For example, chromium-containing compounds capable of interacting with the surface hydroxyl groups of the bimodal silica xerogel support include, but are not limited to, chromium nitrate; chromium trioxide; chromate esters, such as chromium acetate, chromium acetylacetonate, t-butyl chromate and di-tertiary polyalicyclic chromate esters; silyl chromate esters; and phosphorus-containing chromate esters.

In general, a zerovalent chromium, a chromium(II), a chromium(III) or a chromium(VI) compound, or combinations thereof, can be the active catalyst component interacted with the bimodal silica xerogel particle. Non-limiting examples of chromium(II) compounds include chromocene and cyclopentadienyl chromium ethoxide; nonlimiting examples of chromium(III) compounds include chromium(III)acetate, chromium(III)propionate and, preferably, chromium(III)acetylacetonate; non-limiting examples of chromium(VI) compounds include chromium(VI)trioxide, ammonium dichromate and bis-triphenylsilyl chromate. Examples of zerovalent chromium compounds include, but are not limited to, the diarenechromium compounds, such as dibenzene chromium, ditoluene chromium, di-o-xylene chromium, di-p-xylene chromium, dicumene chromium, dimesitylene chromium, di(n-propylbenzene)chromium, di(1,3,5-triethylenebenzene) chromium, di(1,3 -diethyl -4-hexylbenzene) chromium, di-(1,3-dipentylbenzene) chromium, di-(1,3,5-trihexylbenzene) chromium, di(hexaraethylbenzene) chromium, and the like, and mixtures of any two or more thereof.

The chromium compounds useful as the active catalyst component of the polyolefin catalyst generally are liquids or solids that are soluble in common organic solvents. Preferably, the chromium compound is soluble in a nonpolar organic solvent that is sufficiently volatile to allow removal of the organic solvent from the catalyst by evaporation. Classes of suitable organic solvents for solubilizing the chromium compound include alkanes, cycloalkanes, aromatic hydrocarbons, halogenated compounds, ethers, and like non-polar organic liquids. Exemplary organic solvents for the chromium compound include, but are not limited to, pentate, n-hexane, decate, cyclohexane, methylcyclohexane, benzene, xylenes, chloroform, methylene chloride, diethylether, and similar solvents, and mixtures thereof. Polar organic solvents, such as methanol, ethanol, similar low molecular weight alcohols, pyridine and acetone also can be used. It should be understood however that the chromium compound can be introduced onto the bimodal silical xerogel support neat, but it is preferred, for ease and efficiency in handling the chromium compound, than the chromium compound is solubilized in an organic solvent.

In one embodiment, an olefin polymerization catalyst, comprising a bimodal silica xerogel particle of the present invention as the support and a chromium compound as the active catalyst component, is produced by admixing a bimodal silica hydrogel with a water-soluble chromium compound, such as chromium(III)acetate, chromium(III)nitrate, chromium trioxide or ammonium dichromate, then spray drying the resulting mixture. Alternately, in another embodiment, a dry bimodal silica xerogel is interacted with a chromium compound, such as chromium(III)acetylacetonate, n-butyl chromate or dicumene chromium, that has been dissolved in an organic solvent, such as n-hexane, pyridine, acetone, methanol and the like. Interacting the bimodal silica xerogel support with a chromium compound solubilized in an organic solvent is the preferred method of producing the catalyst in order to avoid destroying or adversely affecting the bimodality of the silica xerogel particle. Chromium(III)acetylacetonate is a preferred chromium compound interacted with the bimodal silica xerogel. If the chromium compound is a zerovalent chromium compound, the interaction between the zerovalent chromium compound and the bimodal silica xerogel preferably is performed in a dry, inert atmosphere, such as under nitrogen or under a vacuum, and the resulting catalyst preferably is maintained in a dry inert atmosphere or under vacuum until use.

In general, the preparation of a polymerization catalyst for polymerizing a 1-olefin, and having a bimodal silica xerogel of the present invention as a support material is illustrated as follows:

Chromium(III)acetylacetonate-type catalysts were prepared by first adding a solution of chromium(III-)acetylacetonate (Cr(acac)$_3$) in a non-polar organic solvent, like hexane or methylene chloride, to a slurry of the bimodal silica xerogel dispersed in a nonpolar organic solvent. After agitating the resulting mixture for a sufficient time to allow the Cr(acac)$_3$ to interact with the bimodal silica xerogel, the non-polar organic solvent was evaporated, and the resulting chromium-based polymerization catalyst was dried at a slightly elevated temperature, such as at about 100° C. in a vacuum oven. The dried catalyst then was heat activated. The high temperature activation of the chromium-based catalyst can be omitted when the chromium-based catalyst is used with a metal alkyl cocatalyst.

Several chromium-based polymerization catalysts including a bimodal silica xerogel support were prepared, with each catalyst containing 1 wt. % chromium. These chromium-based catalysts were used in the polymerization 1-olefins, as illustrated by the polymerization of ethylene.

In particular, the preparation of a chromium-based catalyst including a bimodal silica xerogel of the present invention as the catalyst support is illustrated in the following Example 17.

EXAMPLE 17

Preparation of Chromium-Based Catalyst Including a Bimodal Silica Xerogel Support The bimodal silica hydrogel of Example 2 was washed with water until the sodium ion concentration of the wash water was less than 10 ppm. The bimodal silica hydrogel then was rinsed with acetone until the amount of water in the acetone rinse was less than 1% by weight water. The bimodal silica hydrogel was not filtered to dryness prior to rinsing with acetone in order to preserve the bimodal pore structure and distribution. The resulting bimodal silica xerogel then was dried at a temperature of about 100° C. for about 2 hours in a vacuum oven.

Next, the dried bimodal silica xerogel of Example 2 (5.85 g) was added, under a nitrogen atmosphere, to a flask equipped with a stirrer. Methylene chloride (66 g) was added to the flask, and the resulting mixture was agitated to form a slurry. Then, fifty-one milliliters of a solution of $Cr(acac)_3$ in methylene chloride was added to the agitated slurry. The $Cr(acac)_3$ solution included 1.17 mg (milligram) of chromium per ml. of solution, and was prepared by dissolving $Cr(acac)_3$ (1.90 g, including 11.89% by wt. chromium) in 192.4 ml of methylene chloride. The amount of $Cr(acac)_3$ solution added to the agitated slurry was sufficient to provide 0.0597 g of chromium, thereby providing a catalyst having a chromium content of 1.02% by weight.

The resulting slurry including the $Cr(acac)_3$ was agitated at ambient temperature for about 30 minutes. Agitation was stopped, and the chromium-based catalyst was allowed to settle from the slurry. The supernatant liquid was essentially colorless, thereby demonstrating that the chromium was deposited onto the bimodal silica xerogel support.

Agitation then was resumed, the slurry was heated, and, using a nitrogen gas purge, the methylene chloride was evaporated. The resulting chromium-based polymerization catalyst was dried at 50° C. to 70° C., under a nitrogen blanket, for up to about 30 minutes to provide 5.1 g of a purple, free-flowing powder. The chromium-containing catalyst was activated in a glass activator at 820° C. for 6 hours in air by a procedure well-known to those skilled in the art.

In addition to the above-described chromium-based catalyst of Example 17 that included the bimodal silica xerogel of Example 2 as a support, five other chromium-based catalysts were prepared in an essentially identical manner, and used in the polymerization of ethylene. For example, a chromium-based catalyst was prepared using the bimodal silica xerogel of Example 3 and using the bimodal silica xerogel of Example 8, by interacting the xerogel with $Cr(acac)_3$ in the method described above. A chromium-based catalyst also was prepared from the commercially-available silica xerogel, $Cr(acac)_3$ on POLYPOR ® Silica Gel, a standard silica having a pore radius distribution of from about 70 Å to 220 Å, and available from USI Chemical Division, Quantum Chemical Corp., New York, N.Y. The POLYPOR ® Silica Gel is not a bimodal silica xerogel.

In addition, chromium-based catalysts were prepared from the bimodal silica xerogels prepared in Examples 18 and 19. The polymerization catalysts including the bimodal silica xerogels of Examples 18 and 19 were prepared by interacting the bimodal silica xerogel with $Cr(acac)_3$ in the method described above in Example 17.

COMPARATIVE EXAMPLE 18

Figure 25:
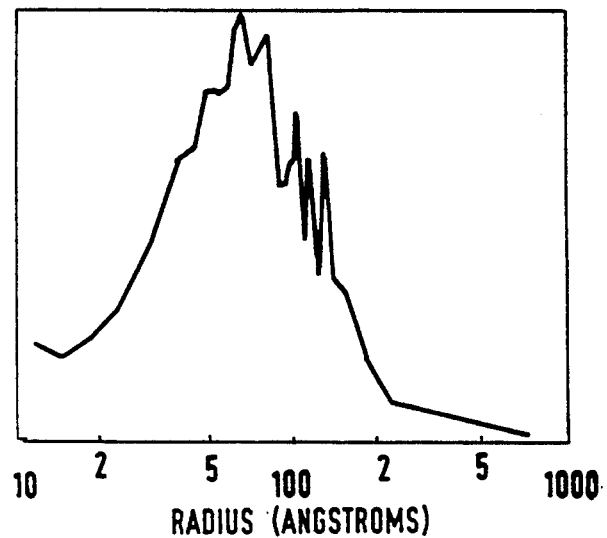

A silica hydrogel was prepared by simultaneously adding a 40% by weight aqueous sodium silicate solution and a 4% by weight aqueous sulfuric acid solution to a heel of water in such a manner that an excess of sodium silicate and an excess of sulfuric acid alternated throughout the addition of the sodium silicate solution and the sulfuric acid solution to the reaction mixture. By this method, the pH of the reaction mixture varied from acidic to alkaline causing at least two distinct precipitations of silica hydrogel. This method provided no aging step after the first precipitation of a silica hydrogel. The resulting silica xerogel had a broad pore radius distribution that exhibited bimodal characteristics. However, as illustrated in the pore radius distribution curve of FIG. 25, the separation between the major pore radius distribution peaks is not distinct, such as greater than about 20 Å. The silica xerogel of Example 18 exhibited a P.V. of 2.37 cc/g and a S.A. of 639 m²/g.

EXAMPLE 19

Figure 26:
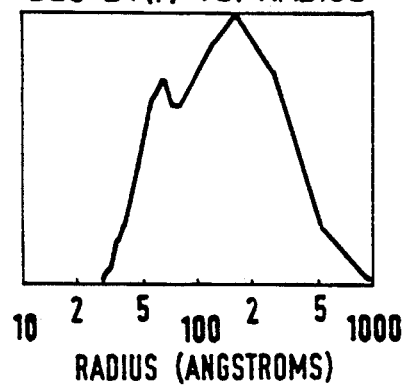

A silica xerogel was prepared in an identical manner to the silica xerogel of Example 2, except the aging period after the second precipitation and prior to heat aging in Example 19 was 2 hours rather than 24 hours. The resulting silica xerogel exhibited a bimodal pore radius distribution, as illustrated in FIG. 26, and had a P.V. of 1.93 cc/g and a S.A. of 264 m²/g.

Ethylene polymerizations were performed using the chromium-based catalysts prepared from the silica xerogels of Examples 2, 3, 8 and 19 and of Comparative Example 18. The resulting polyethylene resins were compared to a polyethylene resin produced from a chromium-based catalyst using a standard silica gel support (POLYPOR ® Silica Gel) to determine whether a resin prepared from a catalyst supported on a bimodal silica xerogel demonstrated a broad or bimodal molecular weight distribution. The results of the ethylene polymerizations are illustrated in TABLE 3.

In general, the chromium-based catalysts including a bimodal silica xerogel support were used in the polymerization of ethylene in a conventional particle form (slurry) process. The slurry process is well-known to a person skilled in the art, and is described in several prior patents, such as U.S. Pat. No. 3,644,323. In particular, a slurry process polymerization is performed in a liquid organic medium at a temperature from about 65° C. to about 110° C. (about 150° F. to about 230° F.). The chromium-based catalyst is suspended in the organic medium, and the polymerization reaction is conducted at a pressure sufficient to maintain the organic diluent and at least a portion of the olefin in the liquid phase. The mole percent ethylene in the reactor is generally maintained at from about 2 to about 25. Hydrogen can be added to the polymerization reaction. The molar ratio of hydrogen to ethylene in the reactor is generally maintained between 0.25 and 1.0. While not necessary for polymerization, a reducing agent is generally included in the reactor with the catalyst.

The organic medium used in the polymerization usually is an alkane or cycloalkane, such as, but not limited to, propane, butane, isobutane, pentate, isopentane, cyclohexane, methylcyclohexane, and the like; and combinations thereof. The organic medium is chosen such that, under the particular polymerization conditions employed, the polymer is insoluble in the organic medium and is readily recoverable in the form of solid particles. Isobutane is a particularly advantageous organic medium. Pressures in the reactor typically range from about 100 to about 800 psig, and catalyst concentrations can range from about 0.0001 to about 1 percent, based on the total weight of the reactor contents. The polymerizations can be conducted as a batch, a continuous or a semi-continuous operation.

Mw/Mn ratios from greater than 8.5 to greater 11.25. A polymer having a high Mw/Mn ratio indicates that the polymer has good flow properties, i.e. processability. For comparative purposes, the polyethylene manufactured using a catalyst having a POLYPOR ® Silica Gel support exhibits a Mw/Mn ratio of 7.84. Such a Mw/Mn ratio is recognized by those skilled in the art as being exhibited by a polyethylene having excellent flow properties. Surprisingly, from TABLE 3, it is observed that a polyethylene manufactured from a catalyst having a bimodal silica support of the present invention exhibits an improved Mw/Mn ratio of from 8.61 to 11.3, and therefore exhibits improved processability and flow properties over a polyethylene prepared from a catalyst having a POLYPOR ® Silica Gel support.

In addition to having a density and a Mw/Mn ratio in the above ranges, the polyethylene resins also exhibited melt indexes (pellet) (MI) in the range of 0.07 to 0.34 and melt index ratios (MIR) in the range 80.6 to 166.

TABLE 3
ETHYLENE POLYMERIZATION WITH CHROMIUM CATALYST ON A BIMODAL SILICA XEROGEL SUPPORT

| Catalyst Support | P.V. | Polymerization Time (minutes)[2] | Productivity[3] | Reactivity[4] | MI[5] | MIR[6] | Density[7] | Mw/Mn[8] |
|---|---|---|---|---|---|---|---|---|
| Example 2 | 2.15 | 36 | 1412 | 2353 | .25 | 110 | — | 8.61 |
| Example 3 | 2.65 | 48 | 3050 | 3813 | .34 | 94 | .9620 | 10.24 |
| Example 8 | 2.37 | — | — | 731 | .07 | 145.7 | .9578 | 10.61 |
| Example 18 | 2.37 | 51 | 2606 | 3067 | .32 | 80.6 | — | 8.72 |
| Example 19 | 1.93 | 49 | 2564 | 3140 | .095 | 166 | .9619 | 11.3 |
| POLYPOR ® Silica Gel (Standard) | 2.40 | 60 | 2192 | 2192 | .76 | 73 | .9624 | 7.84 |

[1] Each catalyst support is interacted with Cr(acac)₃ to provide a catalyst containing 1% Cr; the catalyst was activated at 820° C. for 6 hours in air;
[2] Polymerization conditions:
Temperature: 105 ± 1° C. (221° F.)
Ethylene: about 16.6 mole percent
Total Pressure: 550 psi
Catalyst Charge: 0.0211 to 0.078, Isobutane diluent, except for Example 8;
Example 8 polymerized at 5 mole percent ethylene at 100° C. (211° F.);
[3] Productivity is expressed as g (gram) polyethylene per g catalyst;
[4] Reactivity expressed as g polyethylene per g catalyst per hour;
[5] Melt index;
[6] Melt index ratio (HLMI/MI);
[7] Density is expressed as g per cubic centimeter; and
[8] Ratio of weight average molecular weight to number average molecular weight.

In accordance with the present invention, polyethylene resins having good processing characteristics, high density and high resistance to environmental stress cracking were obtained from a chromium-based catalyst including a bimodal silica xerogel support. Whereas chromium-based catalysts are known, surprisingly and unexpectedly, it has been found that by using a bimodal silica xerogel of the present invention as the catalyst support, the resulting chromium-based catalysts produced resins that exhibit a broad or bimodal molecular weight distribution, thereby having excellent processing characteristics, and also have high densities and high resistance to environmental stress cracking. The combination of desirable processing characteristics, plus both high density and high resistance to stress cracking, makes the resins useful in blow molding applications, and particularly useful in the production of blown bottles.

From the data tabulated in TABLE 3, a chromium-based catalyst having a bimodal silica xerogel of the present invention as a support produced polyethylene resins having densities of at least 0.9578, excellent Mw/Mn ratios, and acceptable flow properties and shear response. More particularly, polyethylene resins produced in accordance with the present invention have exhibited densities from 0.9578 to 0.9620, and The MIR generally is considered an approximation of molecular weight distribution, and is the ratio between the high load melt index (HLMI) determined in accordance with ASTM D1238-57T, condition F, and the MI determined in accordance with ASTM D1238-57T, condition E. In general, with resins having a comparable MI, a polymer with a broader molecular weight distribution has a higher MIR and better flow properties than a lower MIR counterpart. For example, a catalyst prepared from the bimodal silica xerogel of Example 8 provided a polyethylene resin having a polyethylene resin having a MI of 0.07 and a HLMI of 10.2, to provide a MIR of 145.7, thus indicating a broad or bimodal molecular weight distribution.

In general, from the data illustrated in TABLE 3, it has been shown that a chromium-based catalyst, including a bimodal silica xerogel of the present invention as a support, exhibits a greater reactivity and provides broad or bimodal polyolefin resins.

Utilizing the above-described catalysts, it is possible to produce easily processible and highly useful polyethylene resins having a high density, a high Mw/Mn ratio, and a high resistance to environmental stress cracking. For example, polyethylene resins having densities in the range 0.958 to 0.962, Mw/Mn ratios from 8.61 to 11.3 with melt indexes from 0.07 to 0.34 and melt index ratios from 80 to 166 are obtained thereby. It is especially desirable that these polyethylene resin products demonstrate a broad or bimodal molecular weight distribution, and can be obtained using a chromium-based catalyst including a bimodal silica xerogel support. It is extremely useful and advantageous from a commercial standpoint that the bimodal silica xerogel support of the catalyst provides these highly desirable results because necessity of blending polyethylene resins having different average molecular weights thereby can be eliminated. Accordingly, a polyethylene resin having a broad or bimodal molecular weight distribution can be produced in a single polymerization reaction by utilizing a bimodal silica xerogel of the present invention as the catalyst support, wherein the bimodal silica xerogel particle has two average pore radius distributions differing by at least 20 Å.

Obviously, many modifications and variations of the invention as hereinbefore set forth can be made without departing from the spirit and scope thereof, and therefore only such limitations should be imposed as are indicated by the appended claims.

We claim:

1. A polymerization process comprising:
   (A) contacting at least one 1-olefin in a reaction zone under polymerization conditions with a catalyst produced by a process comprising the steps of:
   (a) forming a silica hydrogel by neutralizing an aqueous solution of a silicate, wherein the silicate includes a cation selected from the group consisting of alkali metals, ammonium, and combinations thereof, by adding the silicate solution to a first aqueous acid solution until the silica hydrogel is precipitated;
   (b) aging the silica hydrogel of step (a) in the resulting solution of step (a) for a time sufficient to provide an aged silica hydrogel having a first average pore radius;
   (c) adding silicate solution as defined in step (a) to the aged hydrogel and solution of step (b) to raise the pH thereof to at least about 9;
   (d) neutralizing the resulting hydrogel and solution of step (c) by adding a second aqueous acid solution thereto to lower the pH thereof to about 5 to about 7 to further precipitate the silicate as a hydrogel having a second average pore radius on the hydrogel of step (b);
   (e) heat-aging the resulting hydrogel and solution of step (d) for a sufficient time and at a sufficiently high temperature to fix the respective first and second average pore radii of the hydrogel step (d), wherein the first average pore radius is at least 20 Å different from the second average pore radius;
   (f) washing the heat-aged hydrogel of step (e) with a sufficient amount of water until the cation concentration in the wash water is less than about 10 parts per million;
   (g) displacing the wash water from the heat-aged hydrogel of step (e) by a method selected to avoid substantial collapse of the pores of the heat-aged hydrogel and to reduce the amount of water in the heat-aged hydrogel to less than 1% by weight water;
   (h) drying the product of step (g) to provide a silica xerogel having a bimodal pore radius distribution; and
   (i) depositing a chromium-containing compound on the silica xerogel of step (h); and
   (B) recovering a polymer.

2. The polymerization process of claim 1 wherein the 1-olefin is ethylene.

3. The polymerization process of claim 1 wherein the silicate is selected from the group consisting of sodium silicate, potassium silicate, lithium silicate, ammonium silicate, and combinations thereof.

4. The polymerization process of claim 1 wherein the aqueous silicate solution of step (a) comprises from about 10% to about 40% by weight of silica, as $SiO_2$.

5. The polymerization process of claim 1 wherein the first aqueous acid solution comprises an acid selected from the group consisting of sulfuric acid, nitric acid, phosphoric acid, hydrochloric acid, and combinations thereof.

6. The polymerization process of claim 1 wherein the first aqueous acid solution includes from about 2% to about 12% by weight acid.

7. The polymerization process of claim 1 wherein a sufficient amount of silicate solution is added to the first aqueous acid solution in step (a) to raise the pH of the first aqueous acid solution to about 4.5 to about 7 after the addition of the silicate solution.

8. The polymerization process of claim 1 wherein the silicate solution is added to the first aqueous acid solution in step (a) over a time period of from about 5 minutes to about 20 minutes.

9. The polymerization process of claim 1 wherein the silicate comprises sodium silicate; the first aqueous acid solution comprises from about 2% to about 12% by weight sulfuric acid; and the pH of the first aqueous acid solution in step (a) is raised to about 6 to about 7 after the addition of the silicate solution.

10. The polymerization process of claim 9 wherein the sodium silicate has a ratio of $Na_2O$ in range of about 1:3 to about 1:3.75.

11. The polymerization process of claim 1 wherein the silica hydrogel of step (a) is aged in step (b) for about 15 minutes to about 4 hours.

12. The polymerization process of claim 1 wherein the silica hydrogel of step (a) is aged in step (b) to provide an aged silica hydrogel having a first pore radius distribution in the range of about 20 Å to about 150 Å.

13. The polymerization process of claim 12 wherein the silica hydrogel of step (a) is aged in step (b) to provide an aged silica hydrogel having a first average pore radius of about 40 Å to about 125 Å.

14. The polymerization process of claim 1 wherein sufficient silicate solution is added in step (c) to raise the pH of the aged silica hydrogel and solution of step (b) to about 10 to about 11.

15. The polymerization process of claim 1 wherein the silicate solution in step (c) is added over a time period of from about 10 minutes to about 2 hours.

16. The polymerization process of claim 1 wherein the second aqueous acid solution of step (d) comprises about 2% to about 12% by weight of an acid selected from the group consisting of sulfuric acid, nitric acid, phosphoric acid, hydrochloric acid, and combinations thereof.

17. The polymerization process of claim 1 wherein the heat aging of step (e) is conducted at a temperature in the range of about 70° C. up to about 100° C.

18. The polymerization process of claim 1 wherein the heat aging of step (e) is conducted for a time of about 30 minutes to about 4 hours.

19. The polymerization process of claim 1 wherein the second average pore radius of the silica gel particle is greater than the first average pore radius of the silica gel particle.

20. The polymerization process of claim 1 wherein the silica hydrogel of step (d) has a first pore radius distribution and a second pore radius distribution wherein the second pore radius distribution is in the range of about 50 Å to about 500 Å.

21. The polymerization process of claim 1 further comprising the step of aging the hydrogel of step (c) in the resulting solution of step (c) for a sufficient time to allow the resulting solution of step (c) to interact with the hydrogel of step (c).

22. The polymerization process of claim 1 further comprising the step of aging the hydrogel of step (d) in the resulting solution of step (d) for a time sufficient to provide an aged silica hydrogel having a first average pore radius and a second average pore radius prior to heat-aging the hydrogel in step (e).

23. The polymerization process of claim 22 wherein the hydrogel of step (d) is aged for up to about 24 hours prior to heat-aging the hydrogel in step (e).

24. The polymerization process of claim 1 wherein the aqueous silicate solution further comprises a titanium-containing compound, a zirconium-containing compound, a vanadium-containing compound, or a combination thereof, in an amount such that the sum of the titanium, zirconium and vanadium concentrations in the aqueous silicate solution is about 5 wt. % or less, based on the weight of $SiO_2$ in the silicate solution.

25. The polymerization process of claim 24 wherein the titanium-containing compound, the zirconium-containing compound or the vanadium-containing compound is selected from the group consisting of titanium sulfate, an alkali metal titanium oxalate, ammonium titanium oxalate, ammonium tetraoxalatozirconate (IV) tetrahydrate, an alkali metal tetraoxalatozirconate (IV), a vanadium oxytrihalide, a vanadium pentahalide, a vanadium trihalide, and combinations thereof.

26. The polymerization process of claim 1 wherein the wash water is displaced in step (g) by washing the heat-aged hydrogel with a water-miscible organic liquid capable of replacing water in the pores of the heat-aged hydrogel.

27. The polymerization process of claim 26 wherein the water-miscible organic liquid is selected from the group consisting of acetone, methanol, ethanol, isopropyl alcohol, and combinations thereof.

28. The polymerization process of claim 26 wherein the water-miscible organic liquid displaces about 90% to about 95% of the water from the heat-aged hydrogel, then the resulting silica gel is treated with a ketal of the formula $RC(OR)_2R$, wherein R is the same or different and is an alkyl group including one to five carbon atoms, in the presence of a trace of acid.

29. The polymerization process of claim 28 wherein the ketal is selected from the group consisting of 2,2-dimethoxypropane, 2,2-dimethoxybutane, 2,2-diethoxypropane, 2-methoxy-2-ethoxypropane, and combinations thereof.

30. The polymerization process of claim 26 wherein the wash water is displaced in step (g) by azeotropic distillation with a compound capable of forming an azeotrope with water.

31. The polymerization process of claim 30 wherein the compound capable of forming an azeotrope with water is ethyl acetate or benzene.

32. The polymerization process of claim 1 wherein the wash water is displaced in step (g) by contacting the heat-aged hydrogel with a ketal of the formula $RC(OR)_2R$, wherein R is the same or different and is an alkyl group including one to five carbon atoms, in the presence of a trace of acid.

33. The polymerization process of claim 1 wherein step (h) is performed at a temperature of about 80° C. to about 110° C.

34. The polymerization process of claim 1 wherein the polymerization catalyst of step (i) is calcined at about 400° C. to about 1000° C. for up to about 12 hours.

35. The polymerization process of claim 1 wherein the chromium containing compound is a zerovalent chromium compound, a chromium(II) compound, a chromium(III) compound, a chromium(VI) compound, or a combination thereof.

36. The polymerization process of claim 1 wherein the chromium-containing compound is selected from the group consisting of chromocene, cyclopentadienyl chromium ethoxide, chromium(III)acetate, chromium(III) propionate, chromium(III) acetylacetonate, chromium(IV)trioxide, ammonium dichromate, bistriphenylsilyl chromate, dibenzene chromium, ditoluene chromium, di- o-xylene chromium, di-p-xylene chromium, dicumene chromium, dimesitylene chromium, di(n-propylbenzene)chromium, di(1,3,5-triethylenebenzene) chromium, di(1,3-diethyl-4-hexylbenzene) chromium, di(1,3-dipentylbenzene) chromium, di-(1,3,5-trihexylbenzene) chromium, di(hexamethylbenzene) chromium, and mixtures thereof.

* * * * *